United States Patent
Chalmer et al.

(10) Patent No.: US 6,757,790 B2
(45) Date of Patent: Jun. 29, 2004

(54) DISTRIBUTED, SCALABLE DATA STORAGE FACILITY WITH CACHE MEMORY

(75) Inventors: Steven R. Chalmer, Weston, MA (US); Steven T. McClure, Northboro, MA (US); Brett D. Niver, Grafton, MA (US); Richard G. Wheeler, Belmont, MA (US)

(73) Assignee: EMC Corporation, Hopkinton, MA (US)

(*) Notice: Subject to any disclaimer, the term of this patent is extended or adjusted under 35 U.S.C. 154(b) by 173 days.

(21) Appl. No.: 10/078,923

(22) Filed: Feb. 19, 2002

(65) Prior Publication Data

US 2003/0159001 A1 Aug. 21, 2003

(51) Int. Cl.[7] ............................................. G06F 12/00
(52) U.S. Cl. ...................... 711/147; 711/118; 711/141; 711/142; 711/143; 711/144; 711/145; 711/146; 711/148; 709/212; 709/213; 709/214; 709/215; 709/216
(58) Field of Search ...................... 711/118, 141–148, 711/202; 709/212–216

(56) References Cited

U.S. PATENT DOCUMENTS

| | | | | |
|---|---|---|---|---|
| 5,497,470 A | * | 3/1996 | Liencres | 711/3 |
| 5,829,032 A | * | 10/1998 | Komuro et al. | 711/141 |
| 6,073,218 A | * | 6/2000 | DeKoning et al. | 711/150 |
| 6,167,438 A | * | 12/2000 | Yates et al. | 709/216 |
| 6,292,705 B1 | * | 9/2001 | Wang et al. | 700/5 |
| 6,427,187 B2 | * | 7/2002 | Malcolm | 711/119 |
| 6,460,122 B1 | * | 10/2002 | Otterness et al. | 711/154 |
| 6,567,893 B1 | * | 5/2003 | Challenger et al. | 711/118 |
| 6,622,214 B1 | * | 9/2003 | Vogt et al. | 711/141 |
| 6,678,799 B2 | * | 1/2004 | Ang | 711/141 |

* cited by examiner

Primary Examiner—T Nguyen
(74) Attorney, Agent, or Firm—George A. Herbster

(57) ABSTRACT

The data storage facility includes a plurality of data storage devices coupled through multi-path connections to cache memory. A plurality of interfaces to host processors communicates with the cache memory and with cache tag controllers that define the cache memory again over multiple paths.

80 Claims, 22 Drawing Sheets

| DATA STORAGE BUFFER 29 | |
|---|---|
| APPLICATION MODULES 29 | CONTENT IN DATA BUFFER |
| I/O NODE 28A | CONFIGURATION INFORMATION |
| CACHE NODE 28B | CACHED DATA |
| CACHE TAG CONTROLLER NODE 28C | CACHE TAGS WITH CACHE LINE STATUS |

FIG. 2B

| | CACHE TAG CONTROLLER NODE MESSAGE FORMAT | | CACHE NODE MESSAGE FORMAT | |
|---|---|---|---|---|
| FIELD NAME | 40 REQUEST MESSAGE | 41 RESPONSE MESSAGE | 42 REQUEST MESSAGE | 43 RESPONSE MESSAGE |
| 44 LEN | X | X | X | X |
| 45 OPCODE | X | Y | X | Y |
| 46 ADDR | X | X | X | X |
| 47 SEQ | X | X | X | X |
| 50 REQUESTOR | X | Z | X | X |
| 51 CACHED_1 | X | Z | X | X |
| 52 CACHED_2 | X | Z |   | X |
| 53 OWNER |   | Z |   |   |
| 54 MIRROR |   |   |   |   |
| 55 STATE |   |   |   |   |
| 56 DATALEN |   |   | X | X |
| 57 META |   |   | X | Z |
| 58 DATA |   |   | X | Z |

FIG. 3A

| FIELD | LOGICAL PART |
|---|---|
| 60 LEFT BRANCH POINTER<br>61 MIDDLE BRANCH POINTER<br>62 LOCK VALUE_1 | 1 |
| 63 RIGHT BRANCH POINTER<br>64 PARENT POINTER<br>65 LOCK VALUE_2 | 2 |
| 66 INDEX VALUE_1<br>67 CACHE NODE INDEX_1_1<br>70 CACHE NODE INDEX_1_2<br>71 MIRROR_1<br>72 STATE_1 | 3 |
| 73 INDEX VALUE_2<br>74 CACHE NODE INDEX_2_1<br>75 CACHE NODE INDEX_2_2<br>76 MIRROR_2<br>77 STATE_2 | 4 |

FIG. 3B

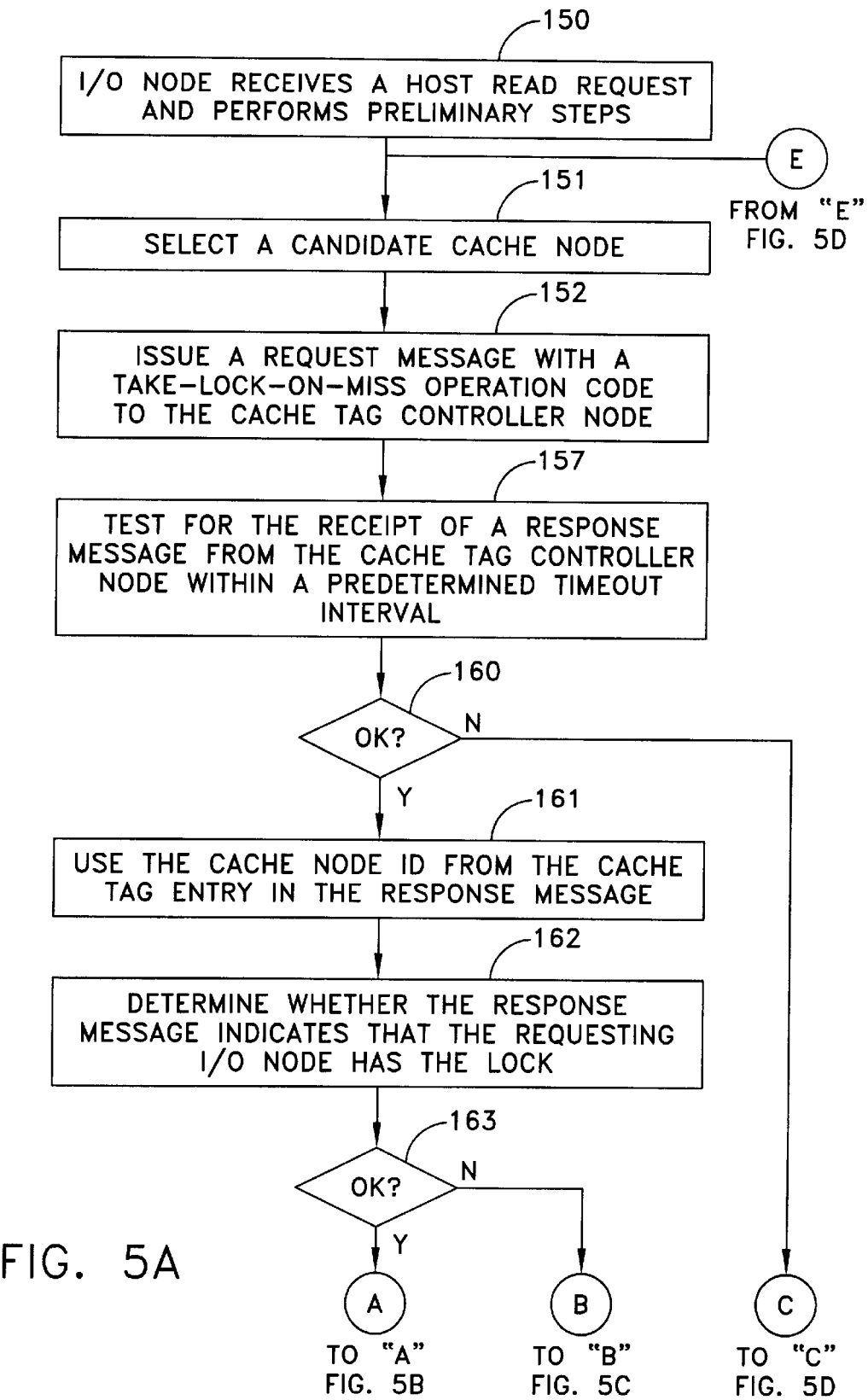

DISTRIBUTED, SCALABLE DATA STORAGE FACILITY WITH CACHE MEMORY

BACKGROUND OF THE INVENTION

1. Field of the Invention

This invention generally relates to data processing systems and more specifically to data storage facilities for use in such data processing systems.

2. Description of Related Art

Early data processing systems comprised a single processor, random access memory and a data storage facility in the form of a single magnetic disk drive. Such systems are still in wide use by small businesses and individuals and as terminals or nodes in a network. The capacities of the single magnetic disk drive associated with such systems are now into the hundred-gigabyte (i.e., $100*10^9$ bytes) range. However, there are many applications in which even these increased capacities no longer are sufficient.

Increased storage capacities required by multi-processing systems with multiple access and increased database sizes have been realized by the development of data storage facilities with disk array storage devices. Concurrently with this development, a need has also arisen to attain redundancy in the data for data integrity purposes. Consequently there now are many applications that require disk storage facilities having terabyte (i.e., $10^{12}$ bytes) and even multiple terabyte storage capacities.

Disk array storage devices have become available from the assignee of this invention and others with such capacities. These systems include a connection to a host system that may include one or more processors and random access memory. Data transfer requests, which include data read and data write requests, are received in an interface or host adapter in the data storage facility and processed into commands that the data storage facility recognizes. These systems use cache memory to enhance operations. A cache memory serves as an intermediate data repository between the physical disk drives and the host systems. Cache memories can reduce the time a data storage facility requires to complete a data read or write operation by returning requested data or by receiving data being sent to the data storage facility.

Such data storage facilities are generally characterized by having a single bus structure that interconnects the physical disk drives, the cache memory and the host adapter. All data commands and all data transfers must pass over this single path. As pressure for increasing data storage capacity and transfer rates continues to increase, the single data path can become a bottleneck. To overcome this bottleneck, some data processing systems now incorporate multiple independent disk array storage devices connected to a single host system. Others incorporate multiple disk array storage devices with multiple host systems.

As these data storage facilities have evolved, so have a number of important characteristics or functional specifications, particularly data redundancy and data coherency. Data redundancy addresses two potential problems. Redundancy at a site overcomes a problem of equipment failure. For example, if data redundancy at a site is achieved by mirroring, two or more separate physical disk drives replicate data. If one of those disk drives fails, the data is available at another physical disk drive. Replicating a disk array storage device at a geographically remote site and storing a copy of the data at each site can also achieve data redundancy. This type of data redundancy overcomes the problem of data loss due to destruction of the equipment at one site because the data at the other site is generally preserved.

Data coherency assures the data at different locations within one or more disk storage facilities is synchronized temporally. That is, if data in a set is stored across two or more separate data storage facilities, at any given instant any one data storage facility should be coherent with the data in the other storage facility. Data could become non-coherent, for example, if a pathway from a host to one of the data storage facilities were to be interrupted without promptly terminating transfers to another related data storage facility.

Generally, a customer initially purchases a disk array storage device with a base data storage facility supplied with a number of magnetic disk drives that provide an initial storage capacity. Often times it is the case that this number of drives is less than a maximum number that the device can support. An incremental increase in the total storage capacity can be achieved merely by adding one or more magnetic disk drives to the existing disk array storage device, generally at an incremental cost. However, when it becomes necessary to expand the capacity beyond the maximum capacity of the disk array storage device, it may become necessary to purchase a new base disk array storage device. The cost of this new base disk array storage device, even with a minimal storage capacity, will be greater than the incremental costs incurred by merely adding magnetic disk drives to the existing disk array storage device. The customer may also incur further programming and reconfiguration costs to integrate the new disk array storage device with the existing disk array storage device.

In many applications, additional capacity is concomitant with a need for greater throughput. However, all the read and write operations for such a disk array storage device continue to involve a single cache memory. Although the cache memory might be expanded, its throughput, measured in the possible number of accesses per unit time, does not increase. In these situations, the capacity increases, but at a reduction in performance as greater rates of read and write operations are encountered. As a result, the ability to scale such disk array storage devices becomes difficult. When such performance problems are anticipated, the usual approach is to add an entirely separate disk array storage device to the data processing system and then to deal with the coordination and coherency issues that may arise.

What is needed is a data storage facility that achieves all the foregoing specifications. That is, what is needed is a data storage facility that provides full redundancy with no single point of failure in the system. Such a data storage facility should be scalable both in terms of the number of host systems that can connect to and the total capacity of the data storage facility. The data storage facility should provide a fully redundant distributed cache memory to provide load balancing and fault tolerance for handling data in the cache memory. Such a facility should be constructed from readily available components with common features for manufacturing and cost efficiency and for limiting the need for spare components necessary to insure reliability. Still further the facility should operate with throughput that is relatively independent of actual storage capacity and the number of host systems connected to that data storage facility.

SUMMARY

Therefore it is an object of this invention to provide a high-performance, distributed cache data storage facility that is scalable to large data storage capacities.

Another object of this invention is to provide a distributed cache, scalable data storage facility that is fully redundant.

Still another object of this invention is to provide a distributed cache, scalable data storage facility that can be scaled both with respect to the number of host systems it serves and the capacity of the storage facility.

Still another object of this invention is to provide a distributed cache, scalable data storage facility that is constructed of readily available components having a common design and for manufacturing and cost efficiency and for reliability.

In accordance with this invention a data storage facility operates with a plurality of data processors, each of which can issue a host request for performing a data transfer with the data storage facility. The data storage facility comprises a plurality of persistent data storage locations at unique addresses in a common address space and control logic for transferring data to and from the addressed locations. A plurality of processor-controlled data handling nodes respond to a host data transfer request for identifying a specific data storage location. The processor-controlled data handling nodes also include cache memory storage at cache memory locations for that data identified in the host request. Processor-controlled cache tag controller nodes maintain cache tags that identify a specific cache memory location for a data storage location. A first multi-path connection interconnects the data handling and cache tag controller nodes. A second multi-path connection interconnects the plurality of the storage locations and cache memory locations.

In accordance with another aspect of this invention, a data storage facility operates in response to host requests from one or more data processors. The data storage facility includes I/O nodes and cache nodes. The cache nodes comprise cache memory locations. A cache tag controller node contains status information about each entry in the cache memory locations. An I/O node responds to a host request by converting an address in the host request into an address for a specific storage location in the plurality of data storage locations. The cache tag controller converts the address for the data storage location into the address of a cache tag location and a cache memory location. A first multi-path connection interconnects the I/O, cache and cache tag controller nodes. A second multi-path connection interconnects the plurality of the storage locations and cache nodes.

In accordance with still another aspect of this invention, data transfers with a data storage facility in response to a data processor generated host request. The data storage facility has a first plurality of persistent data storage locations. The facility establishes a second plurality of cache memory and cache tag locations adapted to store cache tags with status information about a corresponding cache memory location. The facility responds to an I/O request by converting its address into an address for a specific location in the first plurality of data storage facility common address space. The data storage facility also converts the first common address space address into an address for a cache tag location. The cache tag is tested to determine the presence of a cache memory location that corresponds to the location in the host request. A transfer of data with the corresponding cache memory location is initiated for predetermined values of the corresponding status information.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 2B is a table that is useful in understanding the block diagram of FIG. 2A;

FIG. 3A is a diagram that depicts the structure of messages sent by an I/O node or cache node to a cache tag controller node and of the format of registers within those nodes; FIG. 3B depicts a data structure stored in a cache tag controller node;

FIGS. 5A through 5D are flow charts that describe operations that can occur in an I/O node in response to a host read request;

DESCRIPTION OF ILLUSTRATIVE EMBODIMENTS

Figure 1:
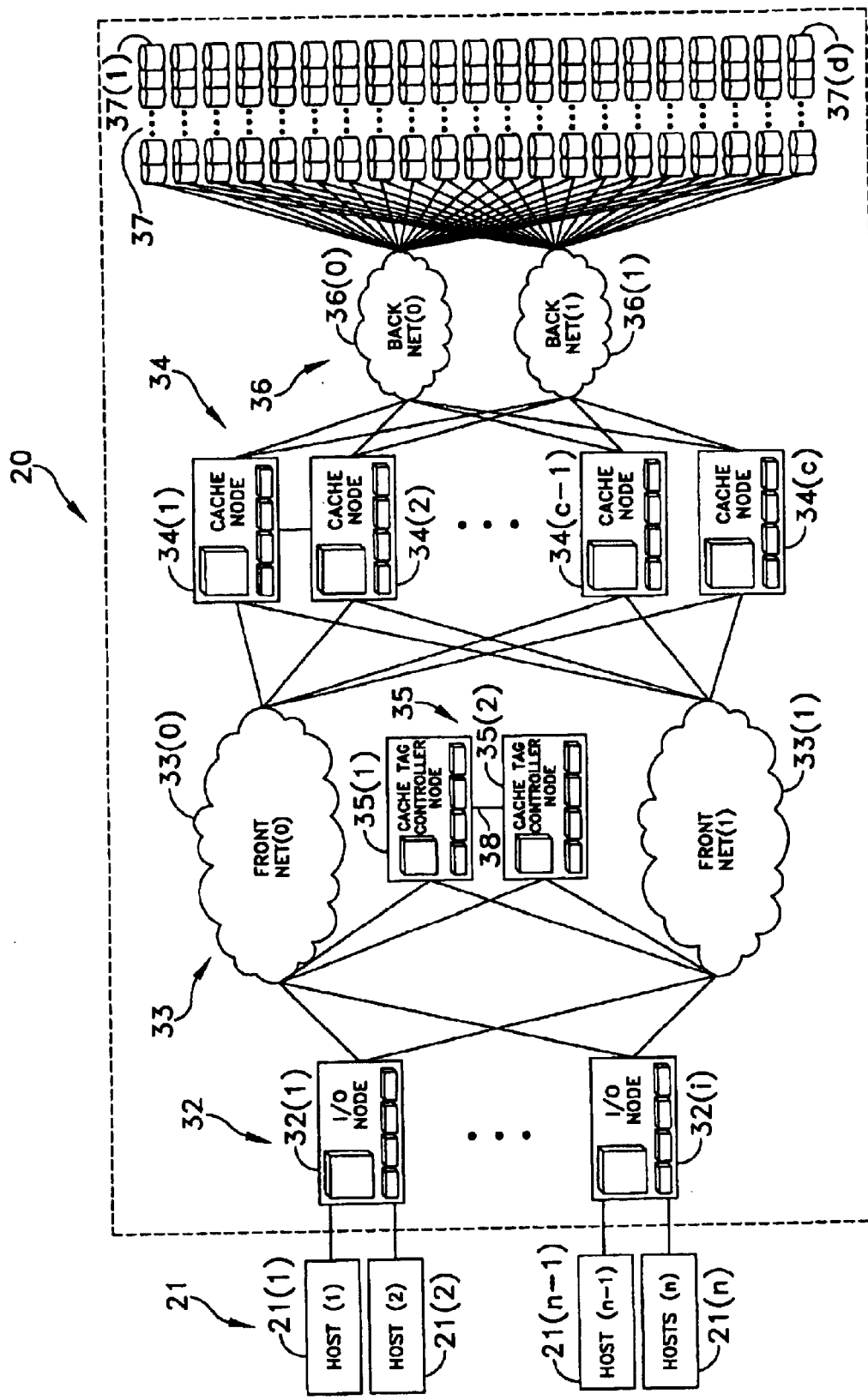
FIG. 1 is a diagram of one embodiment of a data storage facility constructed in accordance with this invention that includes an I/O node, a cache node and a cache tag controller node.

FIG. 1 depicts a distributed cache, scalable data storage facility 20 that embodies this invention. This data storage facility 20 connects for operation for one or more data processors or hosts 21. In this particular embodiment, FIG. 1 depicts four hosts shown as HOST(1) 21(1), HOST(2) 21(2), HOST(n−1) 21(n−1) and HOST(n) 21(n). Each host system has the capability of issuing data transfer requests in a known syntax. In the following discussion, such requests are called host requests. Generally such host requests include an operation code and an address, usually to a virtual location. For example, a host request address may identify a data storage location in physical disk drives or other storage media by identifying a logical volume, an initial address in that logical volume and, for requests that define blocks of different sizes, a block size parameter. The operation code defines a specific operation. Two such operations are important to an understanding of this invention. They are a host read operation and a host write operation. In the following discussion "host read request" is meant to designate an I/O request that initiates a host read operation for data from a location in the data storage facility 20; a "host write request," an I/O request that initiates a host write operation for data to be transferred to the data storage facility 20.

In FIG. 1, the data storage facility 20 comprises persistent data storage locations in storage media controlled by standard building blocks interconnected by multi-path switched interconnection systems. "Persistent" data storage locations are data storage locations in which the data in a specific location remains the same until purposefully changed. Magnetic disk drives or even a set or sets of magnetic disk drives constitute examples of "persistent" storage devices. The standard building blocks, formed from hardware nodes, define a network-like configuration with uniquely identified hardware nodes at different positions within the network. As will become evident, the multi-path switching systems provide parallel communications paths between these hardware nodes and the data storage locations.

Hardware Nodes

Figure 2A:
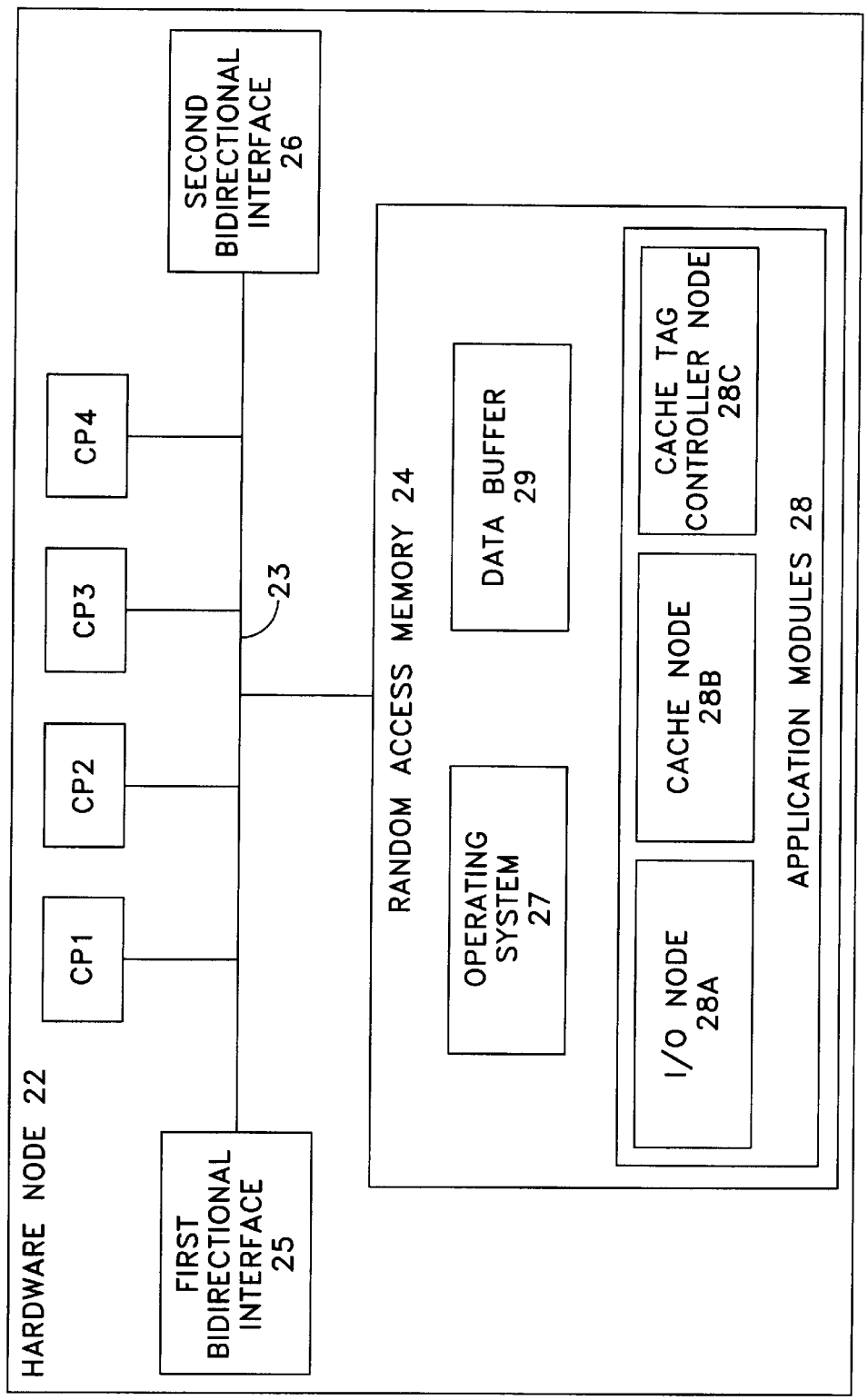
FIG. 2A is a block diagram of a generic node that is useful in this invention as any of the nodes in FIG. 1.

These hardware nodes comprise similarly constructed, circuit structures that are adaptable to perform different functions. FIG. 2A depicts one embodiment of a typical hardware node 22 with multiple processors in the form of CP1, CP2, CP3, and CP4 processors attached to a parallel internal communications path or bus 23. The bus 23, that could have any one of a variety of architectures, enables communications among the processors, such as the processors CP1 through CP4, a random access memory module 24, a first bi-directional interface 25 and a second bi-directional interface 26. The interfaces 25 and 26 provide external communications paths between the bus 23 and other external paths. Each will have a form that will depend upon the specific implementation of this invention and the function assigned to the node 22. In this embodiment the random access memory module 24 contains an operating system 27, an application module buffer 28 and a data buffer 29. The construction of such hardware nodes and use of random access memory for operating systems and for serving as data buffers are known in the art; and such hardware nodes are commercially available.

FIG. 2A depicts a random access memory 24 that stores multiple application modules 28A, 28B and 28C in the application module buffer 28. When an I/O node application module 28A is active, the hardware node acts as an I/O node wherein the data buffer 29 stores configuration information about the data storage facility 20 as shown in FIG. 2B. Control logic, in hardware, firmware and/or software, in a hardware node acting as an I/O node controls the actions of the I/O node in communicating with a host system, particularly in response to host read and write requests. This control logic uses the configuration information in the data buffer 29 to convert the host request address to one or more addresses in the data storage facility based upon address correspondences and mirror information contained in the configuration information. The control logic also enables communications with other hardware nodes, as more clearly described later.

A cache node application module 28B in the application module buffer 28 enables a hardware node as a cache node. As a cache node, the data buffer 29 contains cached data and related information as shown in FIG. 2B. Cache node control logic establishes communications with the I/O nodes, other hardware nodes, such as the cache tag controller nodes, by means of request and response messages. The hardware node acting as a cache node also contains control logic for effecting transfers to and from data storage locations in response to I/O node request messages.

Hardware nodes as shown in FIG. 2A operating as I/O nodes or cache nodes actually handle data as necessary to make the specific data transfer specified in a host request. Consequently, I/O nodes and cache nodes are called "data handling nodes" where the context admits.

The third module in the application module buffer 28 is a cache tag controller node application 28C wherein the data buffer 29 stores cache status and other data useful in identifying the data in the cache nodes as shown in FIG. 2B. Control logic in each cache tag controller node enables responses to request messages from I/O nodes and cache nodes and the generation of response messages reflecting actions taken in response to a request message. Cache tag controller nodes do not process or handle host data.

Data Storage Facility Configurations

There are a variety of configurations by which these hardware nodes can be arranged into a data storage facility. FIG. 1 depicts a data storage facility 20 including data storage locations in magnetic disks as a storage media. This data storage facility 20 includes a plurality of I/O nodes 32 that connect to the various host systems. FIG. 1 depicts representative I/O nodes 32(1) . . . 32(i) where i represents a maximum number of I/O nodes. The first bi-directional interface at each I/O node, such as the bi-directional interface 25 in FIG. 2A, connects to a host and acts as a port. FIG. 1 depicts a configuration where each of the I/O nodes 32 includes two such interfaces or ports. Typically one input port connects to a single host. Bi-directional communications through an I/O node include a host request sent to the I/O node and a host return sent by the I/O node to the host signaling the outcome of the host request. The second bi-directional interface in each I/O node, corresponding to the second bi-directional interface 25 in FIG. 2A, enables communications with different multiple-path connections.

Each of two discrete networks called a FRONT NET(0) connection 33(0) and FRONT NET(1) connection 33(1) forms a first multi-path connection 33 that interconnects to the plurality of I/O nodes 32(1) through 32(i) and to all of a plurality of cache nodes 34 and cache tag controller nodes 35. This particular embodiment includes cache nodes 34(1) through 34(c) and cache tag controller nodes 35(1) and 35(2). In this embodiment, each first bi-directional interface in the cache nodes 34 and cache tag controller, such as the bi-directional interface 25 in FIG. 2A, connects to a node in the connections 33(0) and 33(1).

Each of two additional discrete networks called a BACK NET(0) connection 36(0) and BACK NET(1) connection 36(1) form a second multi-path connection that interconnects all the cache nodes 34 to each of a plurality of individual storage media, specifically physical magnetic disk storage units 37(1) through 37(d), that form an array of data storage locations 37. Bi-directional interfaces, such as the bi-directional interface 26 in FIG. 2A, in the cache nodes 34 attach to the second connections 36(0) and 36(1). The cache tag controller nodes 35 do not require any communications through second bi-directional interfaces.

All the storage locations 37 in the array occupy a single or common address space. That is, a specific address identifies a unique data storage location in one of the units 37(1) through 37(d). Each of these storage units 37(1) through 37(d) includes a controller for responding to a broadcast of an address and control information from one of the cache nodes 34 by effecting a transfer of stored data from one or more addressed data storage locations to a requesting cache node in the case of a read operation or by transferring stored data from a cache node to a data storage location in response to a write operation.

Bi-directional interfaces in each node will also include controls for testing paths through the connections 33(0), 33(1), 36(0) and 36(1) and selecting an alternate path if necessary. That is, the second bi-directional interface in the I/O node 32 can select either the FRONT NET(0) connection 33(0) or the FRONT NET(1) connection 33(1) and test a specific path through that connection. Likewise, the second bi-directional interface in each one of the cache nodes 34 can select either the BACK NET(0) connection 36(0) or the BACK NET(1) connection 36(1). If a selected one of the discrete connections is operating properly, the communications paths are established through that discrete connection. If the selected discrete connection is not operating properly, communications are attempted over an alternate path or even the other interconnection. As will be evident, this use of redundant discrete connections increases reliability because it is highly unlikely that both of a pair of discrete connections will be inoperable at any one time.

Each of the connections 33(0), 33(1), 36(0) and 36(1) can take many forms. For example, the connections 36(0) and 36(1) may comprise switched fabrics for providing redundant high bandwidth communication paths between the cache nodes 34 and the data storage locations 37. The connections 33(0) and 33(1) may also comprise switched fabrics or conventional networks. The selection of a specific implementation will depend upon the relative physical locations of the various hardware nodes and bandwidth requirements for achieving satisfactory performance.

It will be helpful to a further understanding of this invention to consider a data storage facility with a potential capacity of $16*10^{15}$ bytes (i.e., 16 petabytes) requiring a fifty-four (54) bit common address space address. Each hardware node includes a random access memory of at least $16*10^9$ bytes (i.e., 16 Gigabytes). With a single pair of cache tag controller nodes 35, the data storage facility 20 can also be scaled to sixty-four (64) cache nodes 34 with one terabyte ($10^{12}$ bytes) of cache memory reserved for data to be transferred to and from the data storage locations 37. The number of I/O nodes 32 can also be scaled, although the number of I/O nodes will be primarily dependent on the number of parallel hosts requiring access to the system and any redundancy requirements.

This embodiment includes two cache tag controller nodes 35(1) and 35(2) interconnected by a high-speed bus 38. This bus 38 and control logic in each of the cache tag controller nodes 35(1) and 35(2) must operate so status information in the cache node entries are coherent across the two cache tag controller nodes 35. Two cache tag controllers acting in parallel are important if it is anticipated that communications with the cache tag controller nodes could become a bottleneck. As will be apparent, having redundant cache tag controllers 35 also improves reliability. If it becomes necessary to increase the number of cache nodes above some limit, the available memory in the cache tag controllers constructed with conventional components may be insufficient to maintain sufficient status. There is a one-to-one relationship between each location or entry in the cache nodes 34 and in the cache tag controller nodes 35. So if additional cache nodes become necessary, each additional set of cache nodes will require an additional pair of cache tag controller nodes.

While single-byte transfers can be used in such systems, multiple-byte data transfers between the data storage locations 37 and the cache nodes 34 are more efficient. The specifically disclosed embodiment assumes that each data transfer will include a block of $2^{13}$ data bytes (i.e., 8,192 data bytes).

General Operation

Now reviewing the operation in the context of FIG. 1, any one of the hosts 21 can issue a host read or a host write request. One of the I/O nodes 32 receives that request. Each such I/O node, as a requesting I/O node, uses its configuration information for converting the host request address to a specific address in the common address space for the data storage locations 37. If mirroring is involved, the requesting I/O also uses the configuration information to identify each address in the common address space that will mirror the data. In this embodiment it is possible to define up to four locations for replicating or mirroring data. Greater numbers of mirrors could also be used should the need arise.

Then the requesting I/O node sends a request message to one of the cache tag controller nodes 35 that, in turn, converts the common space address into an entry location for a cache tag in a data buffer location or cache entry of the selected one of the cache tag controller nodes 35. There are two features of this operation that are important. First, the requesting I/O node directs its request message to one of the cache tag controller nodes 35 in response to some selection process. A simple process merely requires an I/O node to direct successive request messages to alternate ones of the two cache tag controller nodes 35. A more sophisticated approach might use various load balancing or other procedures. The second feature is that in response to each request message from either one of the I/O nodes 32 or, as described later, from one of the cache nodes 34, the selected one of the cache tag controller nodes 35 performs a function and then returns a response message to the requesting one of the I/O nodes 32 or cache nodes 34.

There are a variety of approaches for identifying the location of a cache tag entry in a cache tag controller node. For example, a $2^{54}$-byte storage capability and transfers of $2^{13}$ bytes in a data block, the data storage locations 37 have the capacity for storing $2^{41}$ data blocks. Thus the upper forty-one (41) address bits of a 54-bit address uniquely define each data block address within the data storage locations 37. The conversion in each of the cache tag controller nodes 35 occurs by hash coding the twenty-nine (29) lower bits of the address to obtain a direct lookup into a table with one entry for each hash code. Each such entry points to a tree with up to $2^{12}$ entries that can be processed rapidly to convert a 54-bit common space address into a pointer to a location of a cache tag in the cache tag controller nodes 35 and a corresponding location in one of the cache nodes 34.

After converting the address, the selected one of the cache tag controller nodes 35 processes the request message from the selected one of the I/O nodes 32 or cache nodes 34 to determine whether a cache tag in the identified cache tag entry is the correct tag. This determination is necessary because the cache nodes 32 will only store a fraction of the total data stored in the totality of the data storage locations 37. Consequently multiple data storage location addresses may convert into the same entry location in the cache nodes 34 and in the cache tag controller nodes 35.

The selected one of the cache tag controller nodes 35 generates a response message indicating status. Assuming that the response message indicates that the cache tag in the identified cache tag entry designates the data storage location specified in the request message, the selected requesting one of the I/O nodes 34 transmits a corresponding request message to a cache node identified by the return message from the selected one of the cache tag controller nodes 35 and then the transfer occurs. If the transfer is successful, the cache I/O node transfers a response message to the requesting I/O node. The requesting I/O node responds by generating a host return that indicates the successful completion of operations in response to the host request. If the process is not successful, the I/O node generates a host return with an appropriate error message.

With a fully redundant data storage facility a cache tag controller node may identify two different cache nodes to participate in the ensuing operation, particularly in the case of a host write request. In such a system, the data is actually transferred from the host to a pair of cache nodes. An I/O node will communicate with the cache tag controller node and request two cache nodes to participate in the transfer. The response message will identify two such cache nodes. The I/O node then sends the data to each of the identified cache nodes. Each cache node receives the data and the data storage location address and information identifying the redundant cache node. Thus as each cache node receives the data, the cache node sends a message back to the requesting I/O node indicating that fact. Then the requesting I/O node sends a host return to the requesting host.

Each of the cache nodes 34 also contains controls for destaging the data in the cache. Destaging is the process of transferring the data from a cache node location, or cache line, to a data storage location, like a record, sector or track in a magnetic disk drive. Data to be destaged resides in two cache nodes at two different cache lines. Controls in each cache node determine when destaging should occur; such controls are known in the art. When one cache node writes its data to the addressed data storage location, that cache node updates the cache tag controller node and redundant cache node to prevent the other cache node from completing a second transfer to the same one of the data storage locations.

Data storage facilities constructed as shown in FIG. 1 or variations thereof have certain advantages. The division of the first and second multi-path connections 33 and 36 into discrete switch fabrics 33(0), 33(1), 36(0) and 36(1) provides full communications redundancy among the hardware nodes and data storage locations 37. Configuring the data storage facility so that two cache nodes are always involved with data transfers to one data storage location makes it highly unlikely that any single point of failure will cause a data loss. This provides better reliability and data integrity characteristics that seen in data storage facilities without this characteristic. The cache tag controller nodes are in parallel; and each cache tag controller node is available to each I/O node and cache node. This redundant, parallel relationship makes it highly unlikely that a failure in a cache node will interrupt and operation or corrupt data. Moreover, the data storage facility is capable of mirroring each data storage location typically to different magnetic disk drives, so there are multiple copies of data. Thus, if a single cache tag controller node or cache node or even a physical magnetic disk drive were to malfunction, an alternate path and data storage locations exist. This maximizes the probability that each host request will transfer the requested data successfully.

In FIG. 1 the data storage facility 20 is bounded by a dotted line as if formed as an integral structure so that all the hardware nodes, storage media and switched interconnections are co-located. However, if either or both of the connections 33 and 36 were formed as conventional wide area networks with sufficient bandwidth, the individual I/O nodes, cache nodes and even different physical disk drives could be located at geographically remote locations. Adding geographical dispersion of the data storage facility minimizes facility exposure to any natural or other disaster at any specific geographical site.

Scalability of the data storage facility 20 in FIG. 1 or like data storage facilities is an important feature of this invention. Assume a single-site system requires an initial capacity of sixty-four (64) terabytes of magnetic disk storage and that each physical magnetic disk drive or set of magnetic disk drives has a capacity of two (2)terabytes, so thirty-two (32) physical magnetic disk drives or drive sets are required. Also assume that for a particular application it is desirable to operate with a 128:1 as a ratio of data storage locations to cache memory locations. If one assumes that each cache node can store approximately 16 Gbyte of data, there is a requirement for 32 cache nodes. The number of I/O nodes will depend upon the configuration of the hosts and the nature of the applications programs in the hosts. For this system each of the interconnections 33(0) and 33(1) will require 1 port for each I/O node, at least one port for each of the cache tag controller nodes 35 and one port for each of the thirty-two cache nodes 34. Each of the interconnections 36(0) and 36(1) will require 1 port for each of the thirty-two cache nodes 34 and at least 3 ports for the physical disk drive units, assuming sets of fifteen physical disk drives connect to one port through an arbitrated loop connection.

Now assume that over time it becomes necessary to increase the storage capacity by adding thirty-two (32) terabytes of data storage capacity to the data storage facility and that a cache tag controller can operate with up to sixty-four cache nodes. This increased capacity requires the addition of sixteen physical disk drives or drive sets to the data storage locations 37 and sixteen cache nodes to maintain the 128:1 ratio. Proportionate increases in the numbers of ports on the interconnections 33(0), 33(1), 36(0) and 36(1) will be required. Assuming that this increase in capacity is not attended by an increase in host activity, there will be no need to add any I/O nodes. If each of the cache tag controller nodes can connect to sixty-four cache nodes, there is no requirement to add any cache tag controller nodes. Therefore, the expansion is incremental without requiring the addition of components that may not provide any benefit to the operation. However, even when the expansion exceeds the cache tag controller node capacity, the addition of another pair of cache tag controller nodes does not require an expense comparable to the cost of a new base disk array storage device of conventional construction.

As still another advantage, the combination of the redundancy and the essentially identical structures of the hardware nodes as shown in FIG. 2A minimizes spares that are required. If one cache node were to fail, any spare hardware node could be configured and substituted. If a cache tag controller node were to fail instead, that same spare hardware could be configured as a cache tag controller node and substituted for the failed cache tag controller node.

Request and Response Messages

The prior discussion alludes to request and response messages. These messages form the basis for communication and control within the data storage facility 20 of FIG. 1. Each message has a specific format of defined fields. Moreover, each hardware node contains control logic and buffer space in its data buffer for receiving a request message from one hardware node, performing a procedure in response to the request message and returning a response message to the requesting hardware node indicating the results of the procedure.

FIG. 3A depicts one set of data fields that can comprise request messages from I/O nodes and cache nodes. The inclusion of specific fields in a message format depends upon whether the request message will be directed to a cache tag controller node 35 or a cache node 34. Column 40 indicates the fields and format contained in a request message sent to a cache tag controller node by either an I/O node or a cache node. Column 41 depicts the fields that the cache tag controller node returns in the same or changed form. In column 41 an "X" represents a field that the cache tag controller node does not change when it generates a return message; a "Y", a field that will be modified; and "Z", a field that may be modified. Similarly columns 42 and 43 indicate the data fields contained in a request message sent to a cache node and the response message from the cache code, respectively, using the same "X", "Y" and "Z" notations to define fields that the cache tag controller does not change, modifies and possibly modifies, respectively. The following discussion refers to the messages by use of these column numbers; that is, the following discussion refers to a cache tag controller request message 40, a cache tag controller response message 41, a cache node request message 42 and a cache node response message 43.

A first field in each message is an LEN field 44. The LEN field specifies the total number of bytes in the message.

An OPCODE field 45 may have different meanings in request and response messages. In a cache tag request message to the OPCODE field 45 constitutes a command for initiating a procedure in the specified active cache node 34 or cache tag controller 35 with respect to a specific cache tag; the response messages may use the OPCODE field 45 for status information that indicates the results of the procedure.

An ADDR field 46 carries the full address of a data storage location 36. This address is a 54-bit address if the data storage facility in FIG. 3 has a potential 16-petabyte capacity. The requesting one of the I/O nodes 32 generates that address based upon configuration information in its data buffer, such as the data buffer 29 in FIG. 2A. Using a 54-bit address enables the data storage facility 20 to operate with byte granularity.

An SEQ field 47 provides a sequence number that ties each response message to a specific request message and requesting one of the I/O nodes 32 or cache nodes 34. The use of sequence numbers for this purpose is well known in the art. In one embodiment, the SEQ field 47 has 64 bits.

A REQUESTOR field 50 contains the identification of the I/O node or cache node that generates the request message. This field improves efficiency by providing a specific address for a response message. The information in the REQUESTOR field 50 can also be helpful in certain error recovery procedures.

CACHEID_1 and CACHEID_2 fields 51 and 52 identify two different ones of the cache nodes 34. When a requesting I/O node generates a cache tag controller request message, information in these fields establishes a specific cache node for use in processing the request message should the cache tag controller node determine that no cache entry exists for the address field. As previously indicated, one feature of this invention establishes redundant cache node operation, particularly in response to host write requests. The CACHEID_1 field 51 identifies one such cache node, such as the cache node 34(1). The CACHEID_2 field 52 could identify another cache node such as cache node 31(c−1).

Each of the foregoing fields is included in any cache tag controller or cache node request or response message.

Messages to the cache tag controller nodes 35 additionally include other fields. For example, as the cache tag controller nodes 35 operate in a coherent manner, changes in any data must occur in a serial fashion. Serialization in this particular embodiment is achieved by assigning a lock for a specific cache tag and cache line to a requesting I/O node or cache node. This lock is applied on an entry-by-entry basis, so a lock on one entry with its cache tag and cache line does not affect any other cache tag and cache line. An OWNER field 53 identifies the lock status. If a lock is assigned, the OWNER field 53 in a response message indicates the I/O node or cache node that holds the lock for that cache tag and cache line. If the OWNER field has a predetermined value, such as a 0 value, the cache tag and cache line are not locked.

A MIRROR field 54 identifies the existence of mirrors for any host request. When data is written to a specific host address and the configuration information identifies the location as being mirrored, the same data will be written to different data storage locations, or mirrored locations. In one embodiment the MIRROR field 54 contains one bit representing each of four mirrors. The I/O node responds to a host request by using the mirror data in the configuration information to generate an address in the common address space for the data storage locations for each mirrored location thereby to identify each mirror location with its own unique 54-bit address.

As described in more detail later, a cache coherency model defining multiple states can define the operation of the data storage facility 20. This specific embodiment uses a four-state model. The state field 55 contains a value corresponding to the existing state of the model.

In addition to the common data fields 44 through 52 in FIG. 3A, cache node request messages 42 contain three additional fields. A DATALEN field 56 defines the length of the data to be included in a write request or to be retrieved from a cache node or data storage locations 37. In this specific embodiment, the DATALEN field 56 can have a value from 1 to 8,192 to define between one byte and 8,192 bytes to be transferred as a data block.

A META field 57 serves as a buffer for different items of information such as mirror information or other address information. For example, for a mirrored write operation the META field 57 in one cache node request message 42 may identify the specific location (i.e., the 54-bit address) of the data storage location for each mirror. The META field 57 and MIRROR field 54 also establish the correspondence between a specific mirror and the address for the corresponding data storage location assigned to that mirror.

The DATA field 58 is available for transferring data between one of the I/O nodes 32 and one of the cache nodes 34. In the case of a reading operation, the DATA field 58 in a cache node request message contains no data, but the DATA field 58 in the cache node response message 41 will contain the data. When a writing operation occurs, the DATA field 58 in a cache node request message contains the data to be written.

Cache Tag Controller Nodes 35

As previously stated, there is a direct correspondence between each entry, or cache tag, in each of the cache tag controller nodes 35 and an entry in a location in one of the cache nodes 34. The cache tag controller nodes 35(1) and 35(2) are redundant and this redundancy is maintained through a high-speed bus 38. As several request and return messages are associated with each data transfer, it is important that the transfers be processed quickly and that the time for transferring data from one cache tag controller node to the other be kept as short as possible.

It also is important that the cache tag controller nodes 35(1) and 35(2) operate in a coherent manner while maintaining overall performance of the data storage facility 20. Such coherency requirements and transfer times may limit the physical length of the bus 38 to reduce any operating delays or errors due to non-coherent data. Further, the operation of each of the cache tag controller nodes 35 should be relatively simple to facilitate response times.

As previously stated, the cache tag controller nodes 35(1) and 35(2) can operate under a four-state model that includes: (1) a non-existent state, (2) an invalid state, (3) an exclusive state and (4) a modified-shared state. A non-existent state exists if the requested cache tag does not exist. When this occurs, there is no corresponding cache node entry, called a "cache line" in the following discussion. That is, when the cache tag controller node converts the 54-bit address to the common address space to a cache tag address, the cache line does not exist anywhere in the cache nodes unless the 54-bit address in the ADDR field 46 in a request message matches the address in the ADDR field in the cache tag stored as an entry in the cache tag controller node. A non-existent state exists at the time of a first-ever request for access to a particular location. It also can exist because the total number of cache lines is a fraction of the total number of data storage locations. At times any given cache tag may be assigned to any of a plurality of data storage locations that are different from the specified data storage locations 37.

An invalid state exists when the I/O node seeks to access the cache node and finds the cache line is locked and the cache line does not contain "valid" data. "Valid" data exists when the data exists only in one cache line.

When two cache nodes contain the same data based upon a single cache line, the cache line is in its modified-shared state. When the data exists in only one cache node and matches the data in the corresponding data storage location, the cache line is in its exclusive state.

It is important to the operation of the data storage facility 20 in FIG. 1 that the cache tag controller nodes 35(1) and 35(2) make the conversion from the 54-bit address included in a request message to a cache tag entry address and corresponding cache line address efficiently and quickly. There are several procedures for making such a conversion. As previously indicated, one procedure involves hash coding to a tree node and then advancing down the tree node to a final cache tag address.

Hash coding the data storage location address (e.g., the 54-bit common space address) provides a pointer to a one node in a tree. Each tree node will have up to three branches, called a "left branch", "middle branch" and "right branch". Each tree node comprises a data structure with information as shown in FIG. 3B. In this specific implementation the data structure comprises four logical parts. Remembering that each transfer may involve entries from two cache nodes, Logical Part 1 includes a left branch pointer 60, a middle branch pointer 61 and a lock value 62 for a first entry. Logical Part 2 contains a right branch pointer 63, a parent pointer 64 and a lock value 65 for the second entry. The separation of the different branch pointers and parent pointer from a strict succession is dictated by the available space in each logical part.

Logical Part 3 includes an index value field 66 for an index value associated with the first entry. As each tree is a 2-3 tree, there can be one or two entries per node. For each node, the index value 66 keeps track of the index itself. This index is then grouped with the indices for the two cache nodes associated with each data transfer request. These are the CACHE NODE_1_1 and CACHE NODE_1_2 entries 67 and 70 that are indices to the cache nodes assigned to each entry. MIRROR_1 bits 71 are used to identify any mirrors associated with a transfer in response to a first entry, as described later. STATE_1 bits 72 identify the state of the cache line identified in the first entry. The INDEX_2 bits 73, CACHE NODE_2_1 bits 74, CACHE NODE_2_2 bits 75, MIRROR bits 76 and STATE bits 77 contain analogous information about the second entry.

If the cache tag controller nodes 35 are formed with multiple processors, such as processors CP1, CP2, CP3 and CP4 shown in FIG. 2A, each processor can be assigned to a specific task. For example, the cache tag controller node 35(1) could dedicate the CP1 processor to handling incoming and outgoing queues for the request and response messages. Processors CP2, CP3 and CP4 could then be dedicated to lookups of cache tag addresses.

FIGS. 4A through 4D depict the operation each of the cache tag controller nodes 35 in response to a request message 40 in the form shown in FIG. 3A. The basic function of the procedures shown in these figures is to assure that cache tag controller operations are serialized, that is, on an atomic basis. The use of this and other procedures assures that conflicting requests from multiple sources are resolved rationally without any loss of data integrity.

Figure 4A:
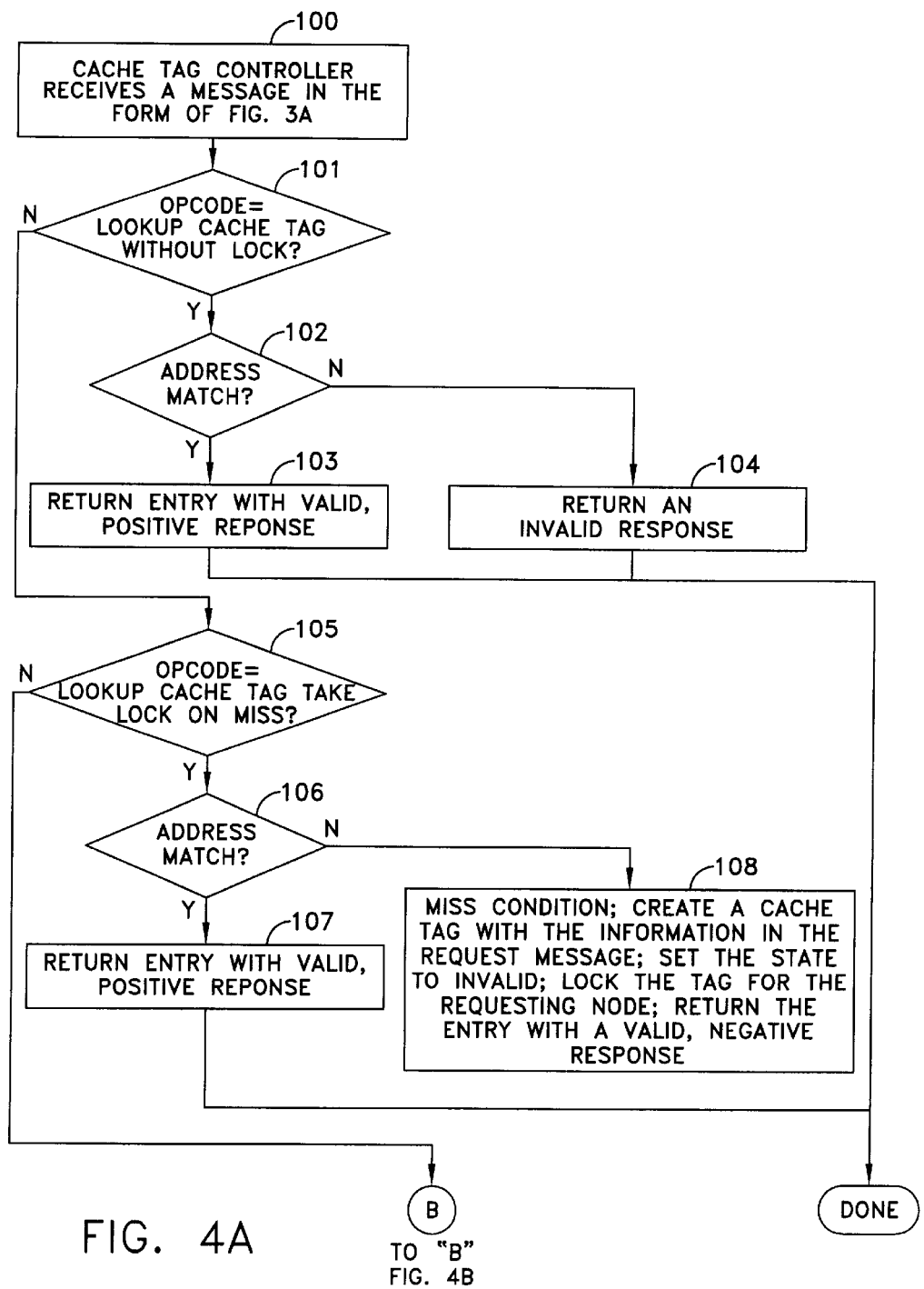
FIGS. 4A through 4D are flow charts that describe certain operations in a cache tag controller node.

Referring to FIG. 4A, when one of the cache tag controller nodes 35 receives a request message 40 at step 100, it decodes the command in the OPCODE field 45. Step 101 transfers control to step 102 if the request message OPCODE field 45 contains a command for determining whether the cache tag controller node contains a cache line that is not locked. This operation will normally be invoked during administrative tasks. If step 102 determines that the address in the cache tag stored in the cache tag controller node is the same as that in the ADDR field 46 of the request message, the cache tag controller node 35 generates a "valid, positive" response message at step 103.

In the following discussion, a valid response message is generated when the cache tag controller node contains a cache tag for the specified address. If the addresses in a request message and in the cache tag match and if locks satisfy certain conditions, the cache line is considered to be valid and the response is a "valid response". A valid response can be either "positive" or "negative". Otherwise the response is an "invalid response".

The response message that step 103 generates indicates that the cache slot exists and is not locked. Consequently, only an address match is necessary to transfer the cache tag controller node to generate a valid, positive response message. If the addresses do not match, step 102 transfers control to step 104 that generates an "invalid" response message.

Either operation of step 103 or 104 replaces the OPCODE field 45 in the request message with a code for one of the response messages. The cache tag controller node then returns the response message to the requesting I/O node. This completes the cache tag controller node response so the cache tag controller node awaits another request message. Alternatively, the response message code could be returned in another field such as the META field 57 if it were used in the request message.

One I/O node command invokes a procedure by which the cache tag controller node 35 determines if the cache line exists for the information in the ADDR field 46 of the request message; the cache tag controller then assigns a lock if the cache slot does not exist. The procedure is used during the response to a host read request. When step 105 decodes this OPCODE field 45, control transfers to step 106 that tests the addresses. If they match, the cache line exists. Step 107 substitutes the code for a valid, positive response in the OPCODE field 45 and returns the message to the requesting I/O node. If the addresses do not match, a "read-miss" condition exists, and step 106 transfers control to step 108. With a "read-miss" condition the requested data is not present in any cache node, so data must be recovered from the data storage locations 37. Step 108 creates a cache tag using the information in the request message. Then it sets the cache tag controller 35 to an invalid state. Next the cache tag controller places a lock on the cache line for the requesting I/O node, thereby preventing any further access to that cache line by any other request message. When this is complete, the information is substituted in the response message along with an operation code specifying a "valid, negative" response. Again this completes the response of the cache tag controller node to this request message and the response message is transferred to the requesting I/O node.

Figure 4B:
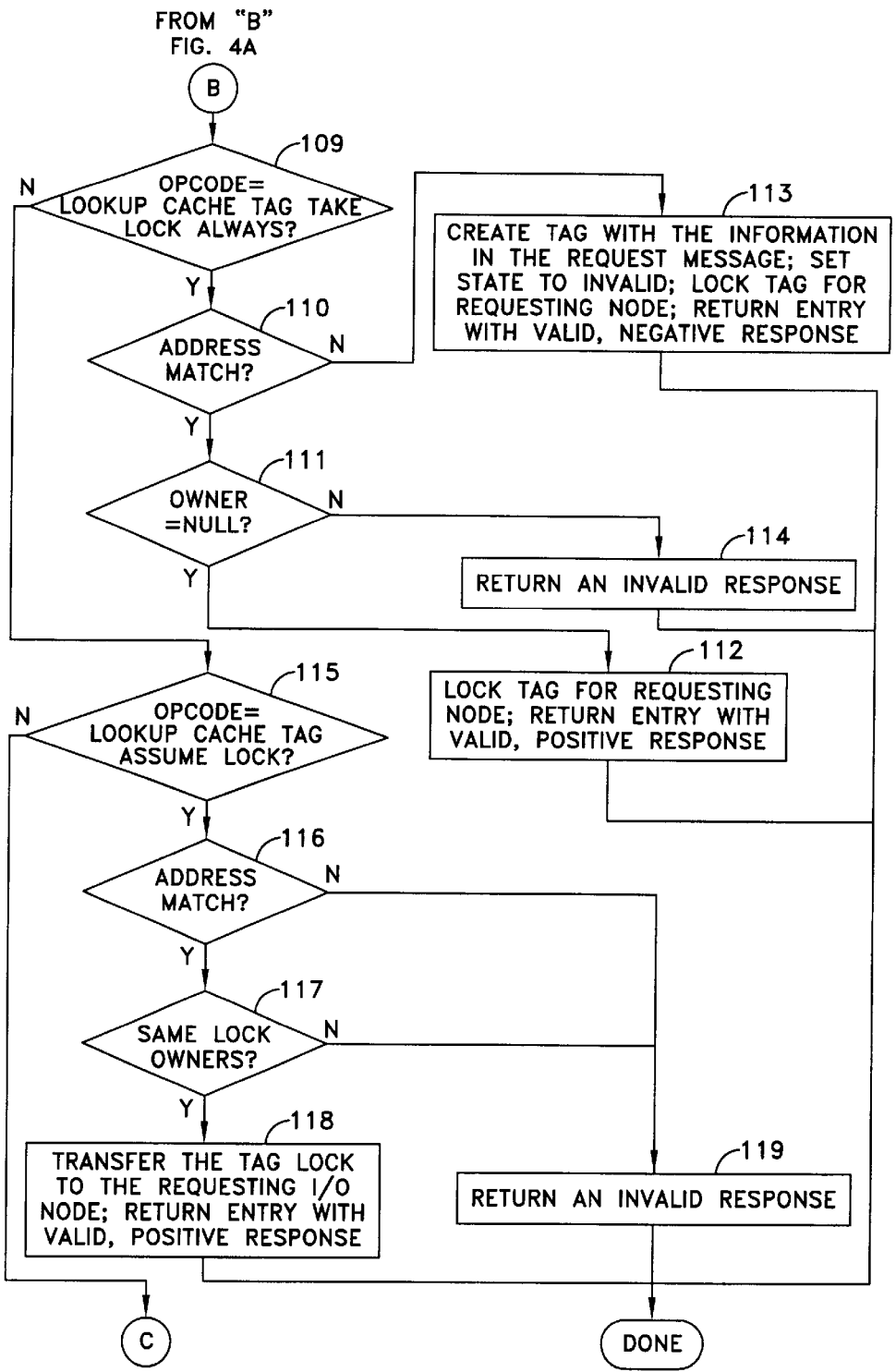

When a request message includes an operation code for taking a lock on a cache line in any situation, step 109 in FIG. 4B transfers control to step 110. An I/O node generates a request message with this operation code during a write operation. If the addresses match, step 110 transfers control to step 111 that determines whether the OWNER field in the cache tag has a "null" value indicating that the cache tag is unlocked. If it is, control passes to step 112 whereupon the cache tag controller node issues a lock on the cache line for the requesting I/O node as identified by the REQUESTOR field 50 in FIG. 3A. Step 112 also returns the request message with an OPCODE field 45 that indicates a valid, positive response, meaning that a cache node contains a cache line for receiving data from the requesting I/O node. If the addresses do not match, control passes from step 110 to step 113. Again this branch occurs if the cache tag controller node indicates that the corresponding cache line does not exist in any of the cache nodes, so a corresponding cache tag must be created. Step 113 creates a cache tag using the information from the request message. Then the cache tag controller shifts to an invalid state and locks the cache line for the requesting I/O node. Next step 113 returns the response message to the I/O node with an OPCODE field 45 indicating a valid, negative response. If another node has the lock, step 111 transfers to step 114 to return an invalid response.

During read and write operations, an I/O node can generate an operation code to test a cache tag and then assume a lock over the cache line. In response to such a request message, step 115 in FIG. 4B transfers control to step 116 to test the addresses. If the addresses match, step 117 examines the OWNER field 53 (FIG. 3A) in the request message and the corresponding information in the cache tag stored in the corresponding cache tag controller node entry. If the two values are the same, the cache tag controller uses step 118 to transfer the lock to the I/O node identified in the REQUESTOR field 50 and returns the response message with an OPCODE field 45 indicating a valid, positive response. If there is no address match in step 116 or if the lock owners are not the same in step 117, control transfers to step 119 that produces a response message with the OPCODE field 45 indicating an invalid response.

During read and write operations an I/O node may generate a request message to update a cache tag in the cache tag controller node 35 and to release any lock. When this occurs step 120 in FIG. 4C responds by transferring control to step 121. Step 121 compares the addresses. If the addresses match, step 122 examines the request message to determine if the cache node indicated in the REQUESTOR field 50 matches the OWNER field in the corresponding cache tag. If it does, control transfers to step 123 wherein the identification in the REQUESTOR field 50 of request message transfers to the OWNER field in the stored cache tag. The cache tag controller node then updates its state with the value in the STATE field 55 of the request message. It also unlocks the cache tag and places a predetermined value in the OWNER field to indicate that the entry has no lock. Finally, step 123 substitutes a valid positive response for the OPCODE field 45 in the response message. If either of steps 121 of 122 does not provide a match, control transfers to step 124 that produces a response message in which the OPCODE field 45 indicates an invalid response.

A command in a request message may define an operation by which the cache tag is updated and its lock is maintained. Step 125 in FIG. 4C transfers control to step 126. Steps 126 and 127 perform the same functions as steps 121 and 122 described above. When both matches are found, step 127 transfers control to step 128. Step 128 transfers the information in the request message to the cache tag stored in cache tag controller node. In this operation, however, the lock is maintained for the requesting I/O node. In addition, step 128 updates the state for the cache tag controller with the value in the STATE field 55 of the request message. When this operation completes, the cache tag controller sends a response message with the OPCODE field 45 that is modified to indicate a valid positive response. If either of the tests in steps 126 and 127 fails, control transfers to step 129 whereupon the cache tag controller establishes a response message in which the OPCODE field 45 designates an invalid response.

At certain times it is useful to delete and unlock a cache tag. When a request message contains this command, step 130 in FIG. 4D transfers control to step 131. Step 131 and step 132 perform the same functions as steps 121 and 122 in FIG. 4C. If both these matches are found, control transfers to step 133. In response to this operation code, step 133 deletes the cache tag in the cache tag controller node, and it generates a response message with the OPCODE field 45 modified to show a valid positive response, and the remainder of the response message at some predetermined value such as being filled with zeros. If either of the matches tested in step 131 and 132 are invalid, control transfers to step 134 to produce a response message with an OPCODE field 45 indicating an invalid response.

Figure 4C:
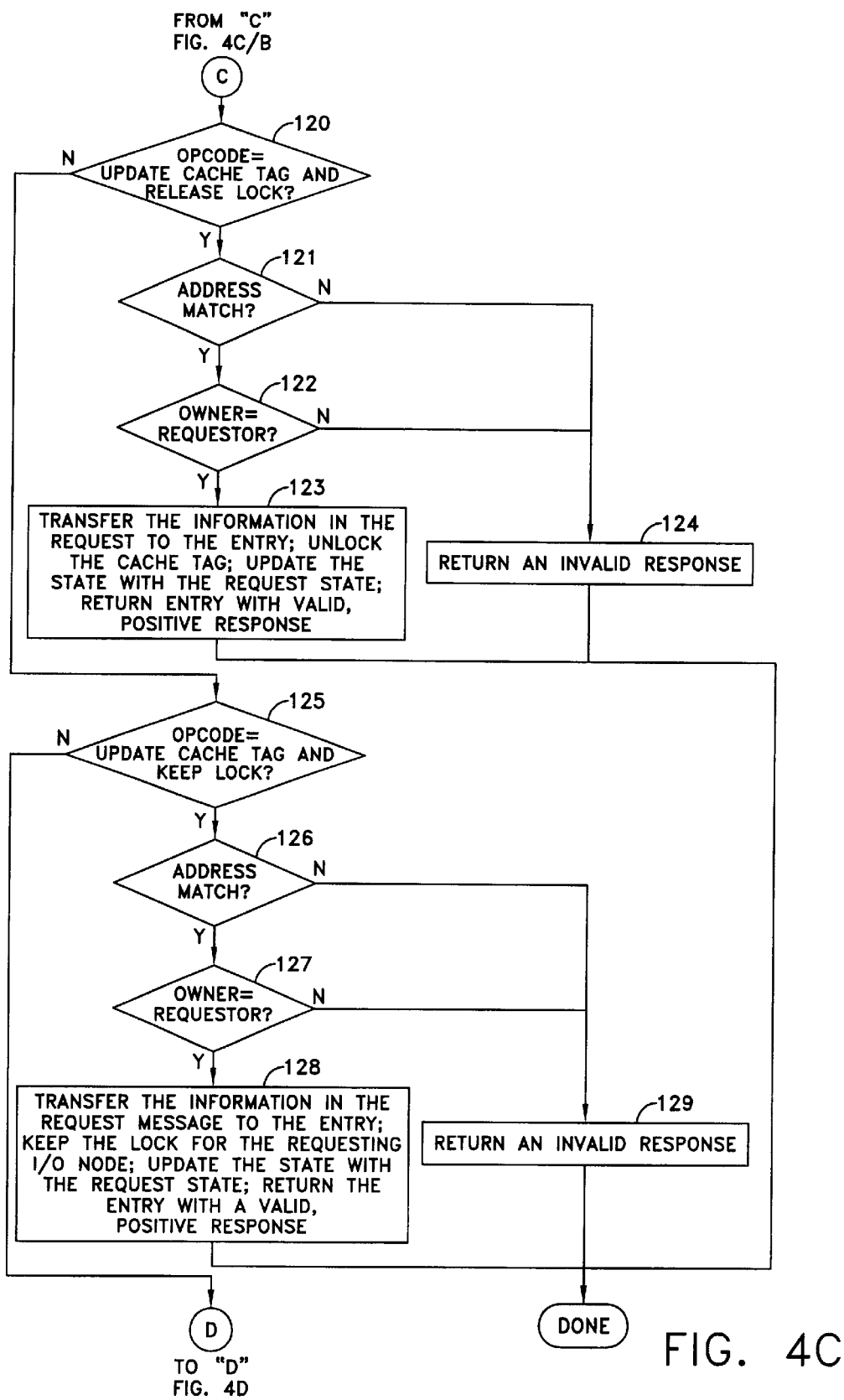
Figure 4D:
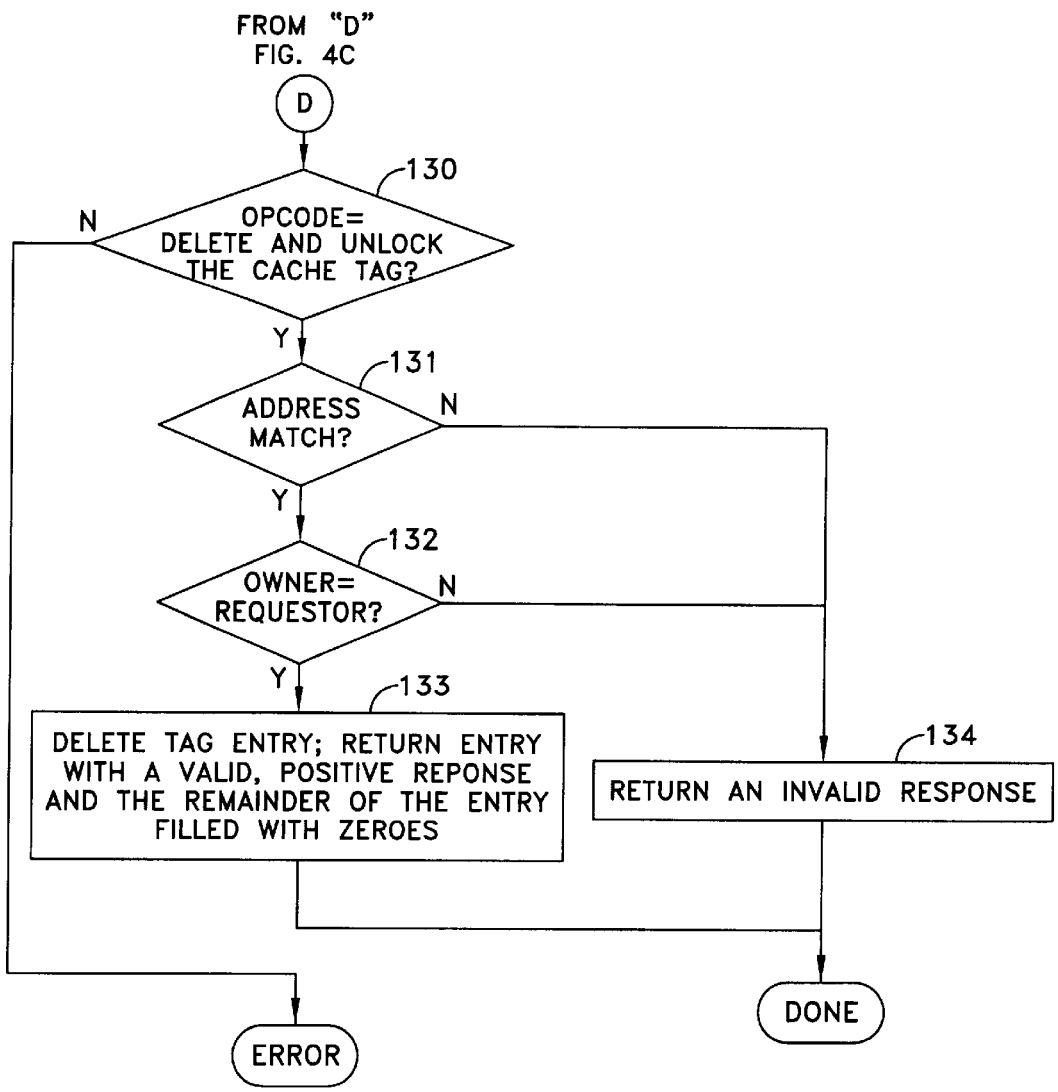

FIGS. 4A through 4D present a complete set of operations and possible operation codes for one embodiment of the cache tag controller nodes 35. Step 130 in FIG. 4D represents the test for the last of the possible operation codes. If step 130 does not decode the specified command, step 130 transfers control to step 135 that generates an error message. FIGS. 4A through 4D also depict a serial operation code decoding sequence for purposes of explanation. Other decoding sequences or procedures could also be used.

I/O Nodes 32—Read Operations

FIGS. 5A through 5D depict the operation of the I/O node application module 28A in FIG. 2A in response to a host read request. Processing by this I/O node application module 28A begins when the one of the I/O nodes 32 receives a host read request at step 150 in FIG. 5A. In step 150 that I/O node, called a requesting I/O node hereinafter, clears and enables state and retry counters and timers that are associated with the read request and are located in the requesting I/O node, converts the host request address to a data storage location address, identifies a cache node for potential use if the corresponding cache tag and cache line do not exist on any of the cache nodes 35 and other preliminary steps.

Next the requesting I/O node selects a candidate cache node in step 151. The configuration information in each of the I/O nodes 32 contains pointers to each of the cache nodes 34. When a requesting I/O node 32 initiates a response to a host read request, it is not known whether a cache tag and cache line actually exist for the addressed data storage location. If they do not exist, it may be possible to assign a particular cache node as being the recipient for a corresponding cache line.

This assignment can be entirely arbitrary. Alternatively, the META field 57 in the return message from each of the cache nodes 34 may contain utilization information from which it is possible to derive loading information about the corresponding one of the various cache nodes 34. An I/O node may use this information in its selection of a cache node for optimized load balancing. Other criteria may be used. Whatever the process, the identification of the assigned cache node is loaded into the CACHEID_1 field 51 (FIG. 3A) of the request message 40.

Then the requesting I/O node generates a request message 40 in the format shown in FIG. 3A with an OPCODE field 45 specifying a take-lock-on-miss operation in step 152. Step 152 transfers this request message to the selected one of the cache tag controller nodes 35.

Figure 6:
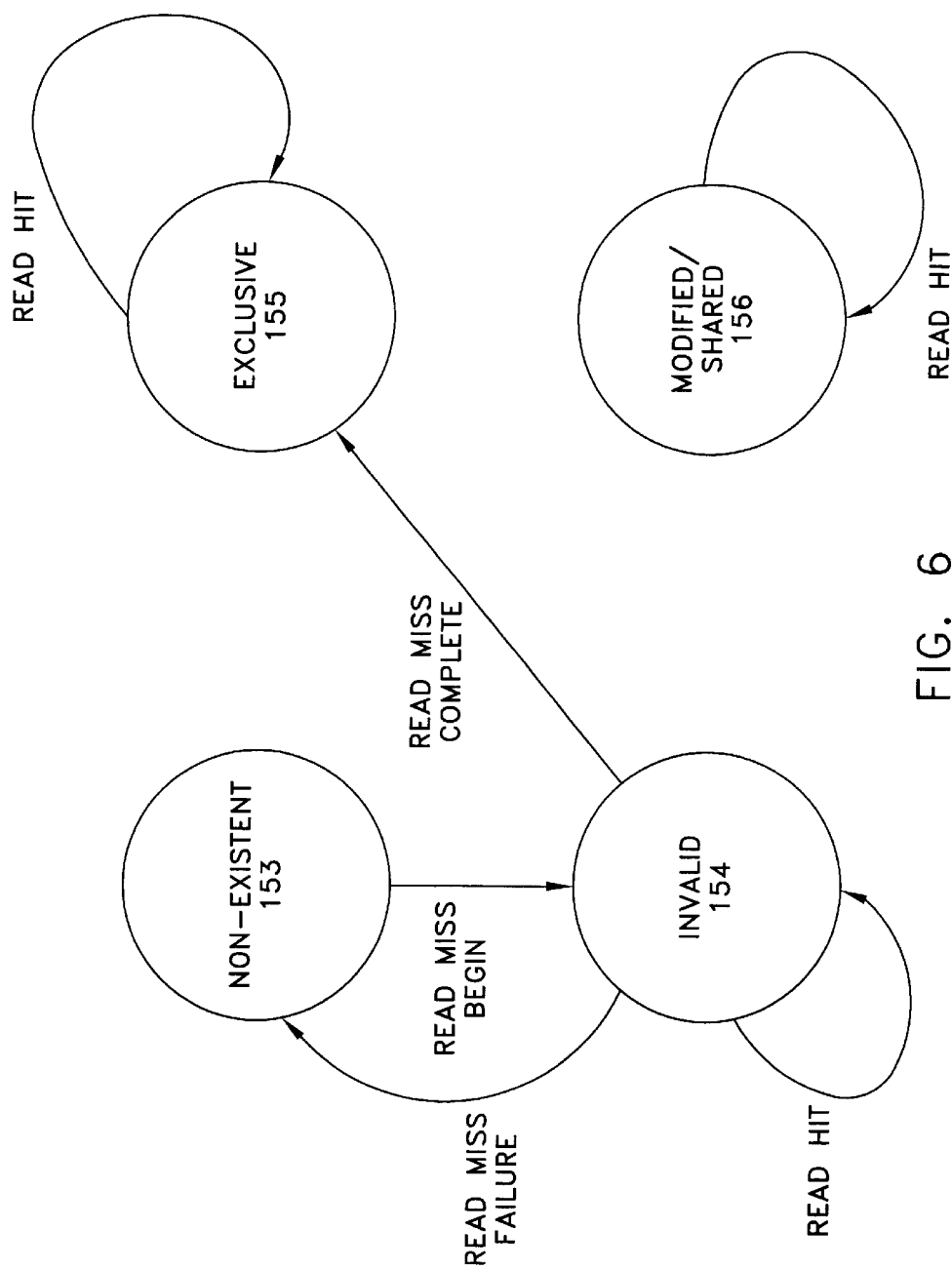
FIG. 6 is a state diagram that is useful in understanding the operations that occur within the data storage facility during a response to a host read request.

As previously indicated, the cache tag controller establishes one of four states for each cache line. FIG. 6 depicts a state diagram for a cache line in the context of a read operation. Each of the circles 153 through 156 represents one of the four possible non-existent, invalid, exclusive and modified-shared states respectively. At the time that an I/O node performs step 150, the I/O node does not have any information about the state of any cache tag entry.

Referring to FIG. 4A, the process of steps 105 through 108 responds to this specific command with one of two return messages. If no address match exists, the cache line is nonexistent and the cache line is considered to be in the nonexistent state 153 in FIG. 6. If the cache tag is nonexistent, step 108 creates a cache tag. The return message then is a valid, negative response indicating that the cache line exists, but contains no valid data. Consequently, this operation transfers the cache line from its non-existent state 153 to its invalid state 154 in FIG. 6.

If, however, the addresses match, the response message is a valid, positive response indicating that the cache line exists with valid data. This step does not alter the state of the cache tag controller node.

Referring again to FIG. 5A, step 157 establishes a maximum time interval during which the response message should be received. If the I/O node receives the response message within that time interval, step 160 transfers control to step 161 that analyzes the return message. This return message contains the identification of the actual cache node for which the cache tag has been created in the CACHEID_1 field 51 in FIG. 3A. It may or may not identify the cache node identified in the request message. Any further request messages directed to this cache tag will identify the cache node identified in the prior response message.

Step 162 then analyzes the OWNER field 53 to determine if the requesting I/O node holds a lock for the corresponding cache line. If it does, a read-miss condition exists and step 163 transfers control to step 164 in FIG. 5B. At this time the cache line is still considered to be in the invalid state 154 of FIG. 6.

Figure 5B:
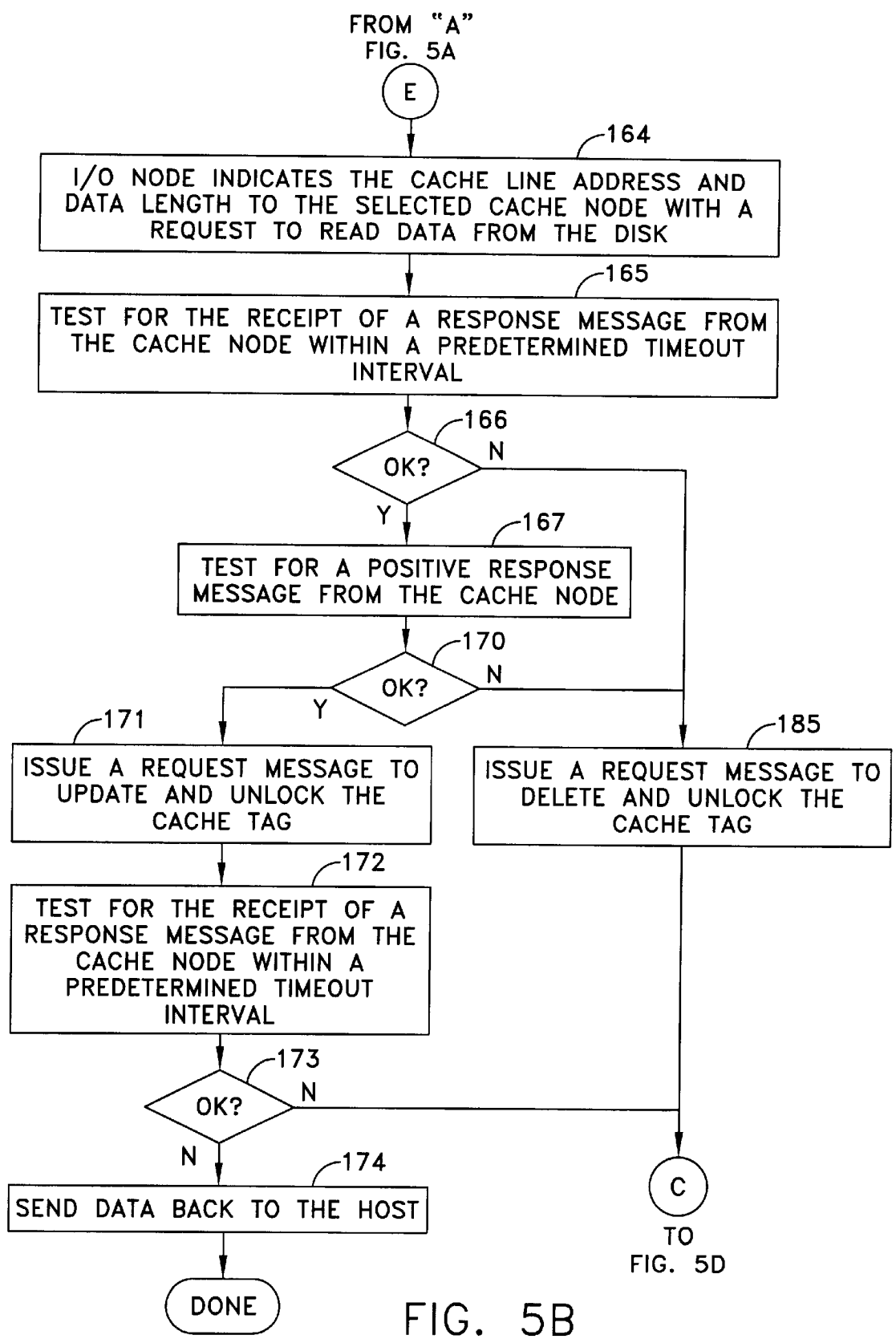

In step 164 of FIG. 5B the I/O node "unicasts" the cache line address and data length to the selected cache node in a request message. A "unicast" operation defines an operation by which an I/O node sends a request message to a single cache node. As has been indicated previously, a single host request to a single data storage location may produce request messages to multiple cache nodes. Such an operation is called a "multicast" operation.

The OPCODE field 45 of this request message causes the selected cache node to transfer the data from the data storage locations 37 back to the cache node 34. Moreover, the process in the cache tag controller node does not change the operating state.

Step 165 establishes a time limit or predetermined timeout interval for a receipt of a response message. If the response message is received in time, step 166 transfers control to step 167.

Step 167 examines the OPCODE field 45 in the response message from the cache node to determine if a valid, positive appears in the response message. When the response message is received, the DATA field 58 contains the requested data. If it does, step 170 transfers control to step 171. Step 171 changes the OPCODE field 45 in the response message from the cache code and generates a request message to the cache tag controller node. In response to step 171 the cache tag controller node changes the operating state for the cache tag to the exclusive state. The OPCODE field 45 in the request message causes the cache tag controller node to update and unlock the cache line. The lock exists because step 152 in FIG. 5A and the action of step 108 in FIG. 4A placed a lock on the cache line.

The cache tag controller node then uses steps 120 through 124 in FIG. 4C to process this request message. In this context, steps 121 and 122 will direct control to step 123 and produce another response message because the addresses will match and the requesting I/O node identified in the REQUESTOR field 50 will match the value in the OWNER field of the cache tag.

Step 172 establishes a time interval during which the response message must be received. If the response message is received promptly, step 173 transfers control to step 174 whereupon the I/O node sends the data contained in the DATA field 58 of the response message to the host. Step 174 is the last operation required for a host read request that involves a read miss. This completion leaves the cache line in an exclusive state.

Referring again to FIG. 5A, if the response monitored in step 162 indicates that the requesting I/O node does not hold the lock, a read hit condition is assumed to exist.

Referring to FIG. 6, a read hit condition can occur when the cache line is characterized by the invalid state 154, exclusive state 155 or modified-shared state 156.

Figure 5C:
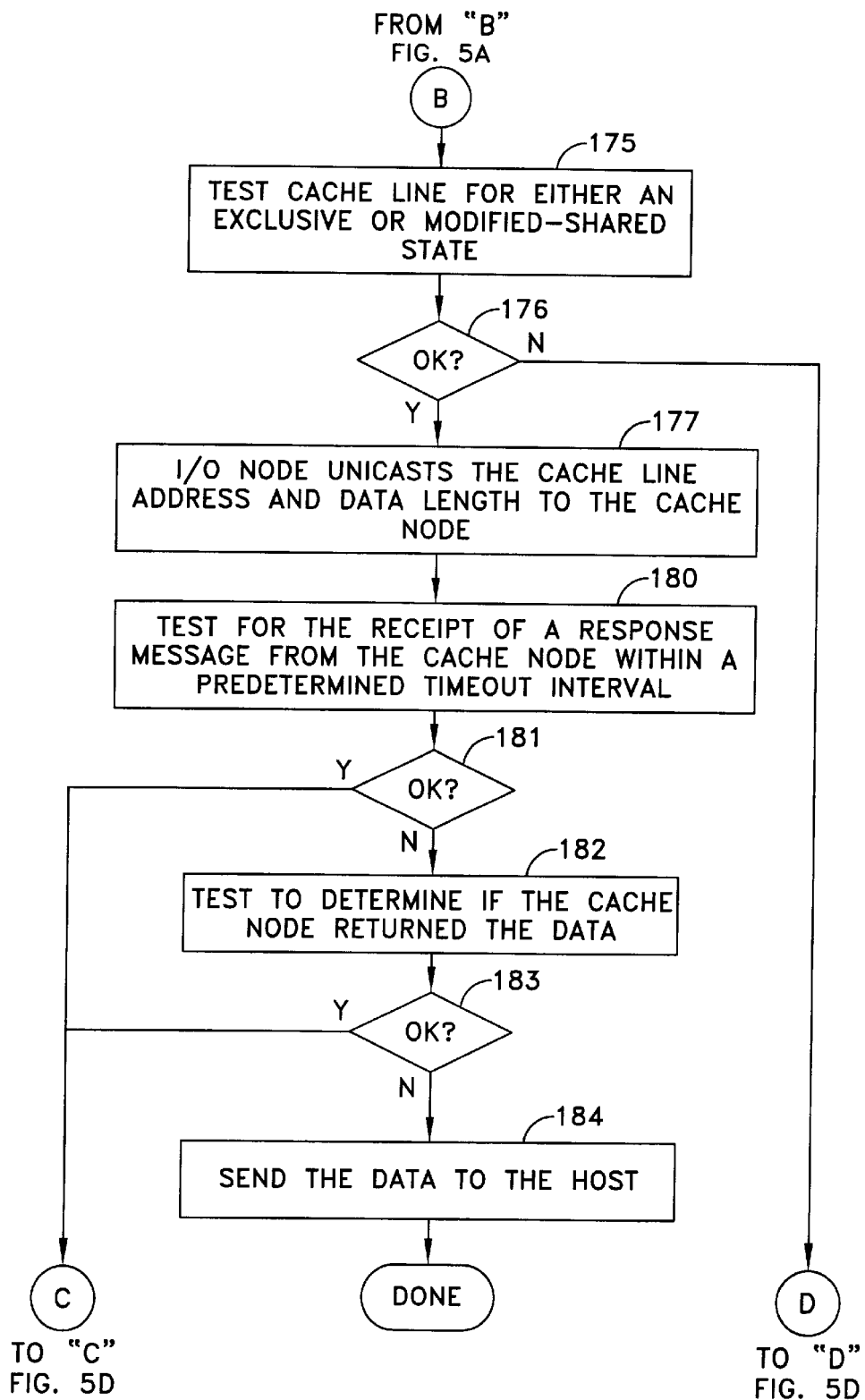

When a read-hit condition exists, control transfers to step 175 in FIG. 5C. If step 175 determines that the cache line is in the exclusive or modified-shared state, step 176 transfers control to step 177. In step 177 the requesting I/O mode unicasts a request message containing the cache line address and data length to the selected cache node. The identified cache node receives this request message, and returns a response message that includes the data. Step 180 determines whether the requesting I/O node receives the response from the cache node contained in the request message within a predetermined timeout interval. If it does, step 181 transfers control to step 182, step 182 determines whether the identification of the cache node in the CACHEID_1 field 51 in the response message matches the cache node identified in the REQUESTOR field 50. If it does, step 183 transfers to step 184 that sends the data contained in the response message DATA field 58 to the host and completes the host read request.

If either step 166 or step 170 in FIG. 5B monitors a negative result, control passes to step 185 whereupon the I/O node transmits a request message with a command to unlock and delete the cache tag. This request message causes the cache tag controller node to respond with the process of steps 130 through 134 in FIG. 4D and to change the operating state from the invalid state to the non-existent state. In this context, however, steps 131 and 132 will transfer directly to step 133 that deletes the tag and returns an appropriate response message. Then step 185 transfers to step 186 in FIG. 5D.

Figure 5D:
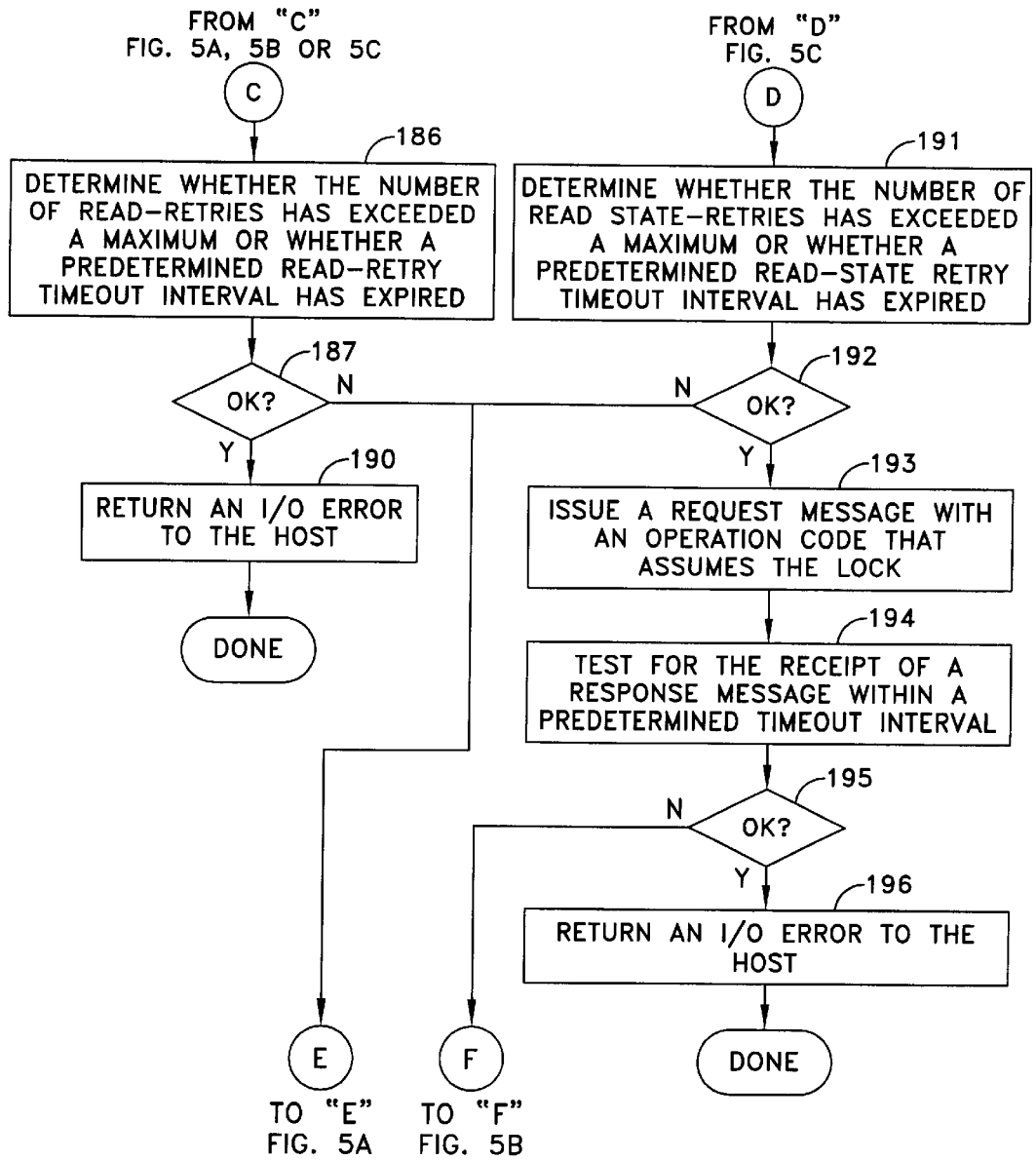

If any of the tests at step 160 in FIG. 5A, step 173 in 5B, or steps 181 or 183 in FIG. 5C produce a negative result, control transfers directly to step 186 in FIG. 5D. As previously indicated, step 150 in FIG. 5A clears a read retry counter. Step 186 thus alters the read retry counter and determines whether a maximum number of read retries for this host read request have been exceeded. Step 186 also determines whether a maximum read time for this host read request has expired. If either of these conditions is met, step 187 transfers control to step 190 whereupon the requesting I/O node returns an I/O error to the host. Reaching a maximum number of retries in step 186 indicates it is unlikely that the data storage facility will ever obtain the requested data. Exceeding the timeout indicates that the time required to obtain the data is too long. Generally a host will respond by taking any of a variety of error recovery procedures as known in the art. If, however, the test of step 187 shows there is time for an additional retry and an additional retry does not exceed the maximum, control passes from step 187 back to step 151 in FIG. 5A to repeat the read process.

Referring to FIG. 5C, step 175 monitors the cache line state for the read request. If the state is not exclusive or modified shared, step 176 transfers control to step 191 in FIG. 5D that performs a test to determine whether a maximum number of state retries have been attempted or whether a time out interval has been exceeded. If neither has been exceeded, control transfers back to step 151 in FIG. 5A. However, if either limit has been exceeded, step 192 transfers to step 193. Generally, either of these limits is exceeded when a node, other than the requesting node, has a lock for an extended interval. Typically this will occur when the other node has malfunctioned. In this case step 193 issues a request message to the cache tag controller node with a command for assuming the lock. The operation is similar to that shown in FIG. 4B by steps 114 through 117, except that is assumed that the same lock owners exist. Also the cache tag controller does not change the cache tag state with this response. Consequently, step 117 transfers the lock to the requesting I/O node and the response message returns as valid, positive response in the OPCODE field 45 and the requesting I/O node identification in the OWNER field 53.

Still referring to FIG. 5D, step 194 establishes a timeout interval during which the requesting I/O node should receive a response message. If the message is received in a timely fashion, step 195 transfers control to step 164 in FIG. 5B. Otherwise an error condition exists and control passes to step 196 to initiate the transfer of an appropriate error message to the host.

From the foregoing, it will be apparent that if a host read request identifies a location that exists in one of the cache nodes, the cache node will transfer the data back to the requesting I/O node provided the cache line is either in the exclusive state 155 or modified-shared state of 156 of FIG. 6 without any need to access a data storage location 37. If the cache line has an invalid state 154, the read hit has no impact. It may continue to retry until the retry counter exceeds a maximum value or the timeout interval expires. If a corresponding cache line does not exist, the state of the cache line begins with a non-existent state 153 and transfers to an invalid state 154. If the operation is completed successfully, the cache line assumes exclusive state 155. If it does not, then the cache line returns to a non-existent state 153.

I/O Nodes-Write Operations

Figure 7A:
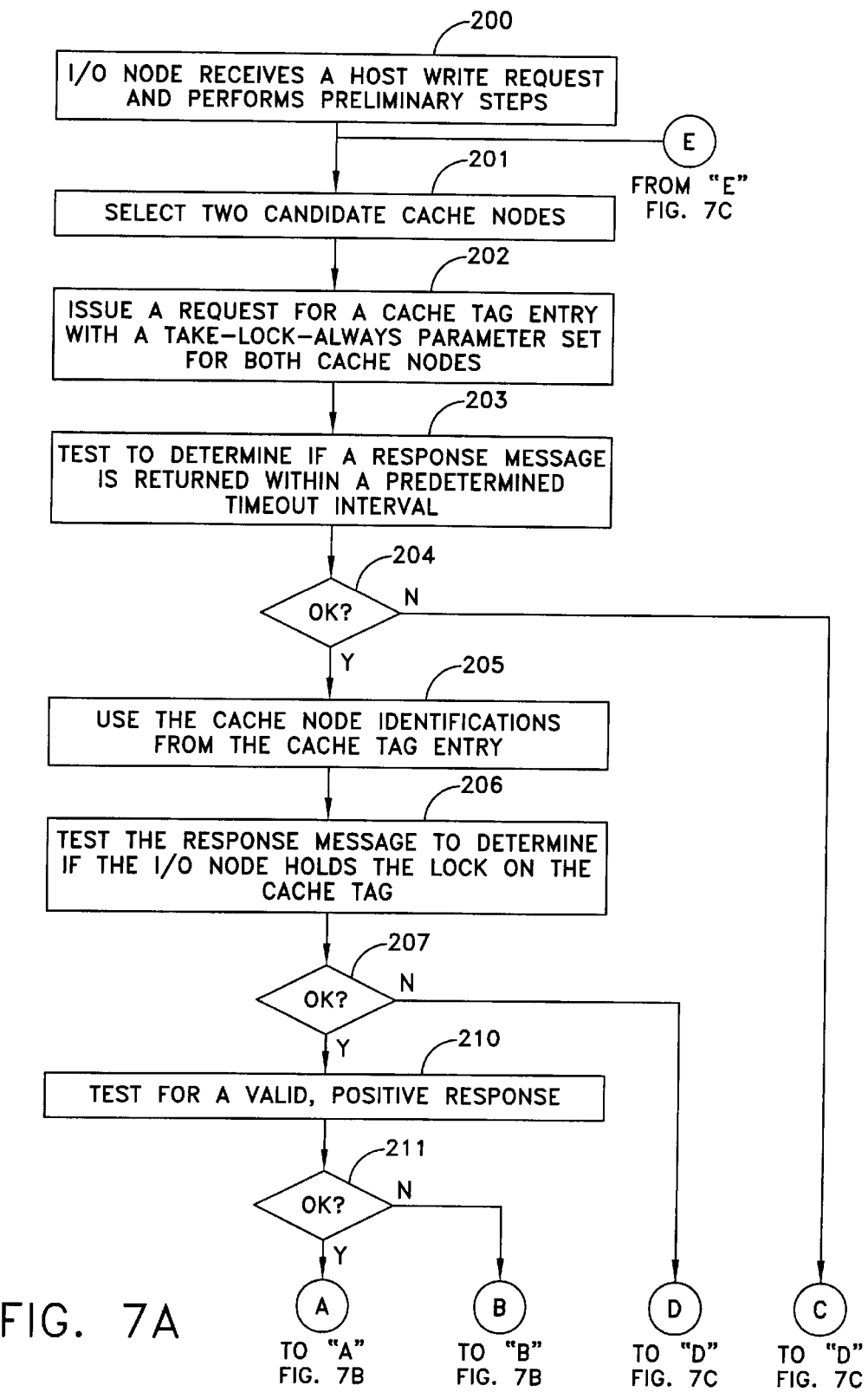
FIGS. 7A through 7C are flowcharts that describe operations that can occur in an I/O node in response to a host write request.
Figure 7B:
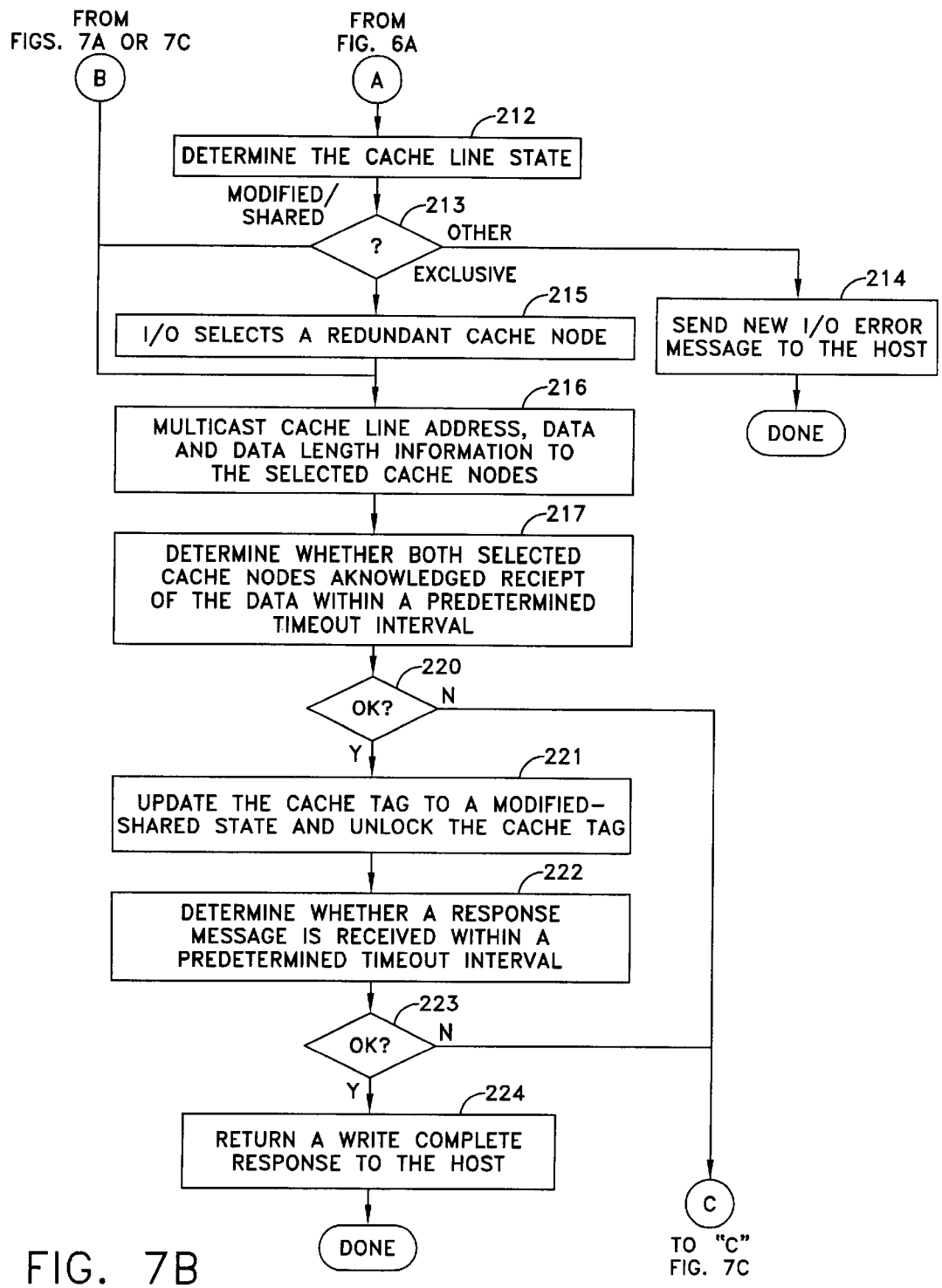
Figure 7C:
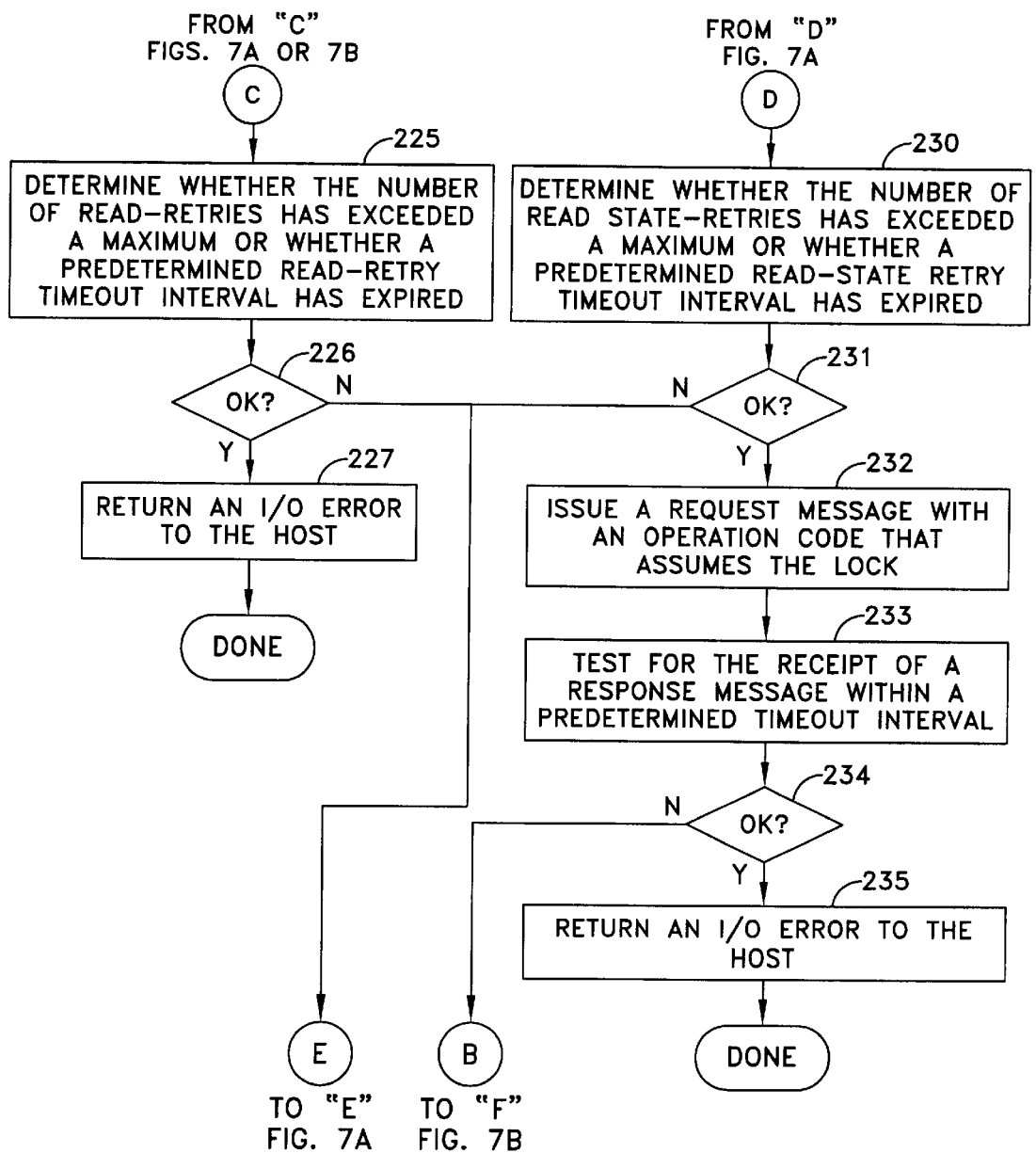
Figure 8:
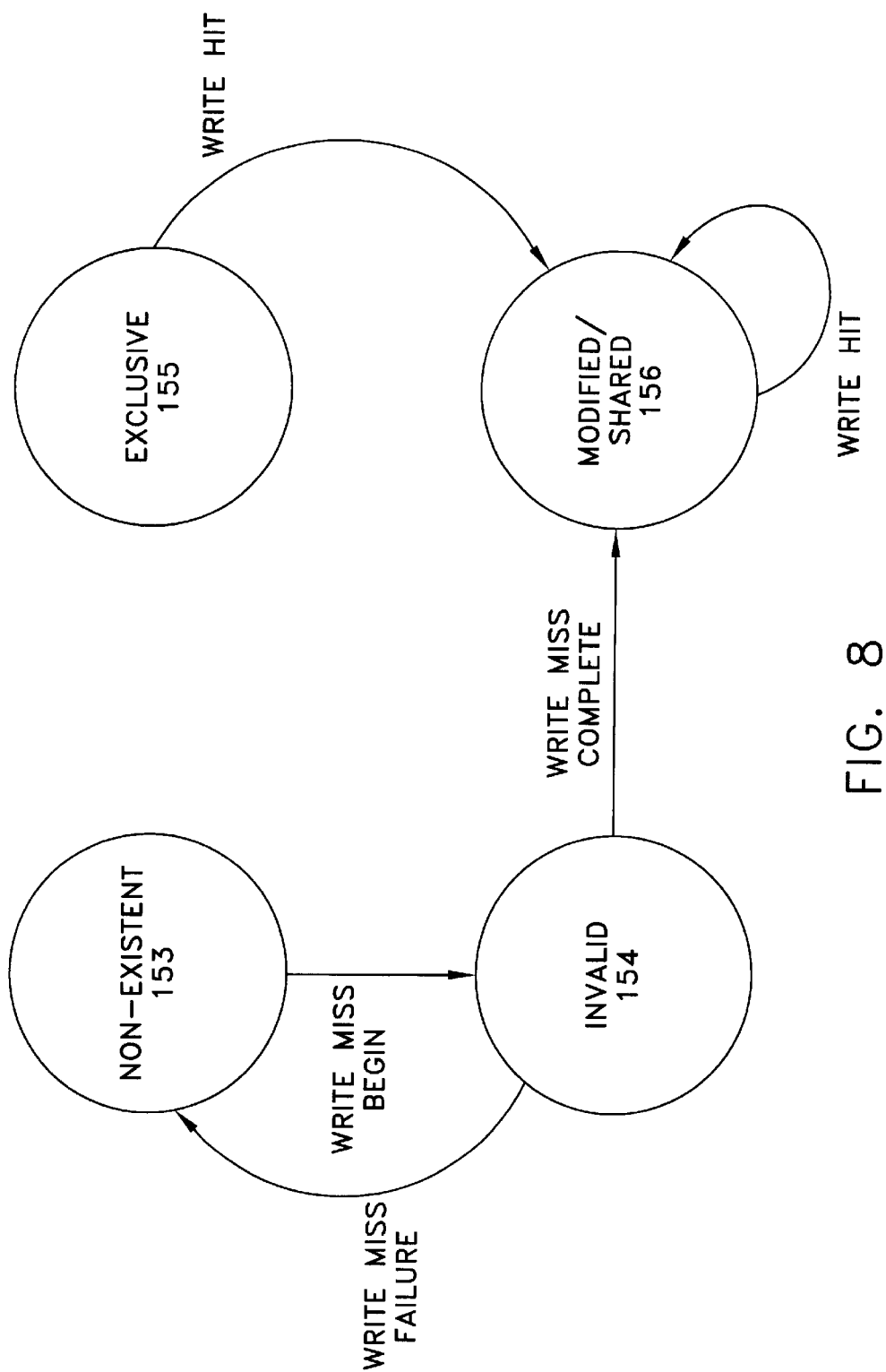
FIG. 8 is a state diagram that is useful in understanding the operations that occur within the data storage facility during a response to a host write request.

FIGS. 7A through 7C depict the operation of an I/O node in response to a host write request, and FIG. 8 depicts the state changes that occur using the same states 153 through 156 as shown in FIG. 6. When the I/O node receives a host write request, the I/O does not have any information about the state of the cache line. Step 200 in FIG. 7A clears those state counters and retry counters and timers associated with each write request and located in the requesting I/O node. The requesting I/O node converts the address in the host write request to a specific address for the data storage locations 37 in FIG. 1 and any other necessary preliminary steps and buffers the data. Then control passes to step to 201 that selects two candidate cache nodes. As previously indicated for redundancy it is desirable that two paths be established to the same data storage location. Step 201 places the two cache node identifications in the CACHEID_1 and CACHEID_2 fields 51 and 52. In step 202 the requesting I/O node issues a request message with a command to take a lock on each cache node identified in the CACHEID_1 and CACHEID_2 fields 51 and 52.

The cache tag controller node responds by performing the process identified by steps 110 through 113 in FIG. 4B. That is either it identifies the tag or does not. If the addresses match in step 110, step 113 also sets the cache tag to an invalid state; otherwise the state remains unchanged. If the response message is received with a timeout interval, step 204 transfers to step 205 by which the I/O node uses the two cache node identifications now contained in the CACHEID_1 and CACHEID_2 fields 51 and 52 in the response message. For each entry the requesting I/O node examines the OWNER field 53 in step 206 to determine whether it owns the lock. If it does, step 207 transfers control to step 210 to determine if the response is a valid positive response indicating the lock exists. The cache tag controller does not change the cache tag state during this operation.

If a lock exists, a write-hit condition exists and step 211 transfers to step 212 in FIG. 7B. Step 212 examines the contents of the STATE field 55 in the return message that should define either the modified-shared state 156 or the exclusive state 155 in FIG. 8. Step 213 tests for these different states. If the STATE field 55 indicates either an invalid state or non-existent state, step 213 transfers control to step 214 to return an I/O error to the host and terminate any further response to the host write request.

As previously indicated, each write request is processed by two independent cache nodes to maintain redundancy. If step 213 determines that the STATE field 55 in a response message indicates an exclusive state in 155 in FIG. 6, only one cache node contains a cache line so no redundancy exists. In that case, control passes from step 213 to step 215 where requesting the I/O node selects a redundant cache node and then transfers to step 216. If the STATE field 55 indicates a modified-shared state 156 in FIG. 6, control passes directly from step 213 to step 216 because the redundancy exits. Likewise if there is a valid negative response in step 211, a write miss condition exists. Control then passes to step 216. At this point, two cache nodes are identified.

Step 216 multicasts the cache line address data and data length in request messages to the cache nodes identified by the CACHEID_1 and CACHEID_2 fields 51 and 52 in FIG. 3A to selected cache nodes. Step 217 in FIG. 7B establishes a timeout interval for the receipt of both response messages. If those responses are received in a timely fashion, step 220 transfers control to step 221. Step 221 issues a request message with a command to update the cache controller entry to reflect a modified-shared state, indicating that two cache lines have the data and to unlock the cache tag. When a cache tag controller node receives the message containing corresponding contents of an OPCODE field 45, it decodes and responds to this command in accordance with steps 120 through 124 in FIG. 4C and updates the cache tag state with the value in the STATE field 55 of the request message. Step 121 and 122 in the context of this operation transfer control to step 123. Step 123 transmits a response message indicating that the cache tag is unlocked with a valid positive response. Step 222 establishes a time interval during which that response should be received. If a response is received within that time interval, step 223 transfers control to step 224 whereupon the I/O node returns an acknowledgement to the host indicating that the host write request has been completed successfully.

If any of the tests in step 204 in FIG. 7A or steps 230 and 233 in FIG. 7C fail, control transfers to step 225 in FIG. 7C. Step 225 determines if, for this write request, the value in a write retry counter exceeds a maximum number or whether a write retry time-out counter has timed out. If either situation exists, step 226 transfers control to step 227 that returns an I/O error code to the host indicating an unsuccessful completion operation in response to the host write request. Otherwise control transfers back to step 201 in FIG. 7A for a retry.

If the test in step 207 regarding the lock fails, control transfers to step 230 in FIG. 7C that determines whether the number of state retries exceeds a certain value or whether a write state retry timeout has expired. Either of these limits is exceeded when another node has a lock for an extended interval, usually indicating that the other node is malfunctioning. In this case step 232 issues a request message to the cache tag controller node with a command for assuming the lock. The operation is similar to that shown in FIG. 4B by steps 114 through 117, except that is assumed that the same lock owners exist. Consequently, step 117 transfers the lock to the requesting I/O node and the response message returns as valid, positive response in the OPCODE field 45 and the requesting I/O node identification in the OWNER field 53. The cache tag controller does not change the cache tag state with this response.

Still referring to FIG. 7C, step 233 establishes a timeout interval during which the requesting I/O node should receive a response message. If the message is received in a timely fashion, step 234 transfers control to step 216 in FIG. 7B. Otherwise an error condition exists and control passes to step 235 to initiate the transfer of an appropriate error message to the host. If either test indicates that an additional retry is permissible, control passes either from step 226 or step 231 to step 201 in FIG. 7A.

From the foregoing, it will be apparent that if a host write request identifies a location that exists in one of the cache nodes, the cache node will accept the data from the requesting I/O node provided the cache line is either in the exclusive state 155 or modified-shared state of 156 of FIG. 8. If the cache line is in the exclusive state 155, the processing of the write operation will result in the storage of the data in another cache node. Consequently, the state changes to the modified-shared state 156. If the identified cache line does not exist when the I/O node begins processing the write request, the cache tag and cache line are in a nonexistent state 153. Then the state changes to an invalid state 154 and to either a modified-shared state 156 or a non-existent state 153 depending upon whether a cache entry is obtained or not.

Cache Node Operation

There are also times when a cache node communicates with a cache tag controller by means of request and response messages. Write operations and the existence of a full cache node present two particular situations requiring such communications. As previously indicated, a write operation produces cache lines in redundant cache nodes even though the data eventually will be stored in a single set of data storage locations. Once a write operation has been completed and the data resides in a data storage location, the requirement for redundancy at the cache node level ends. In such a case, the cache node needs to eliminate one of the cache lines and make appropriate changes or updates to the information in the cache tag controller nodes so one of the cache lines will be available for operations with other host read or write requests.

In the unlikely event that a cache node were to use all the available space for cache lines, it would be necessary to delete, or cast out, a cache line. As previously stated, each cache node monitors the utilization of each cache line over time. Such monitoring systems are well known in the art. Moreover, any of a number of known algorithms can process this utilization information and select a cache line for removal.

Figure 9A:
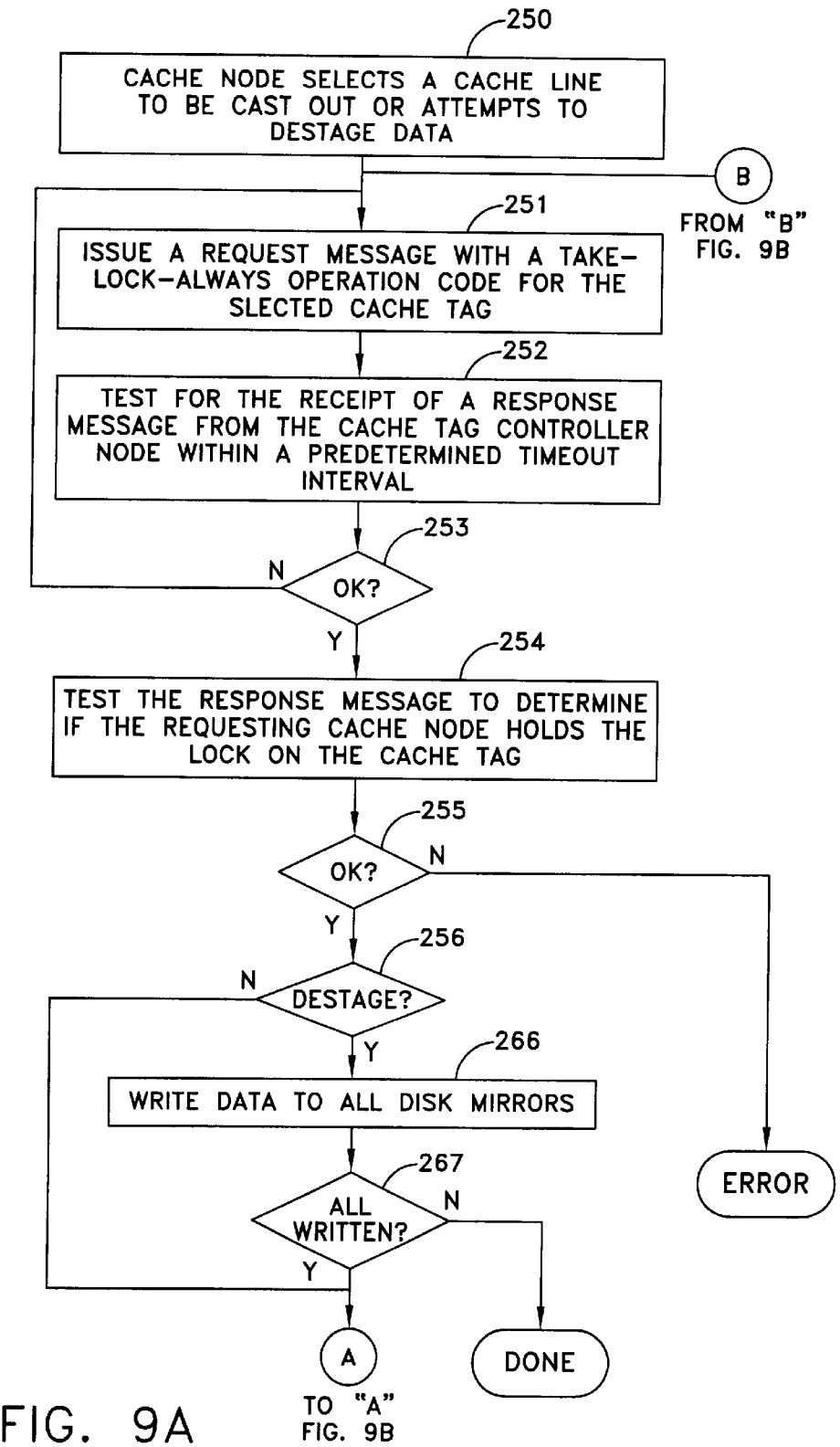
FIGS. 9A and 9B are flowcharts that describe operations that can occur in a cache node during certain maintenance operations.
Figure 9B:
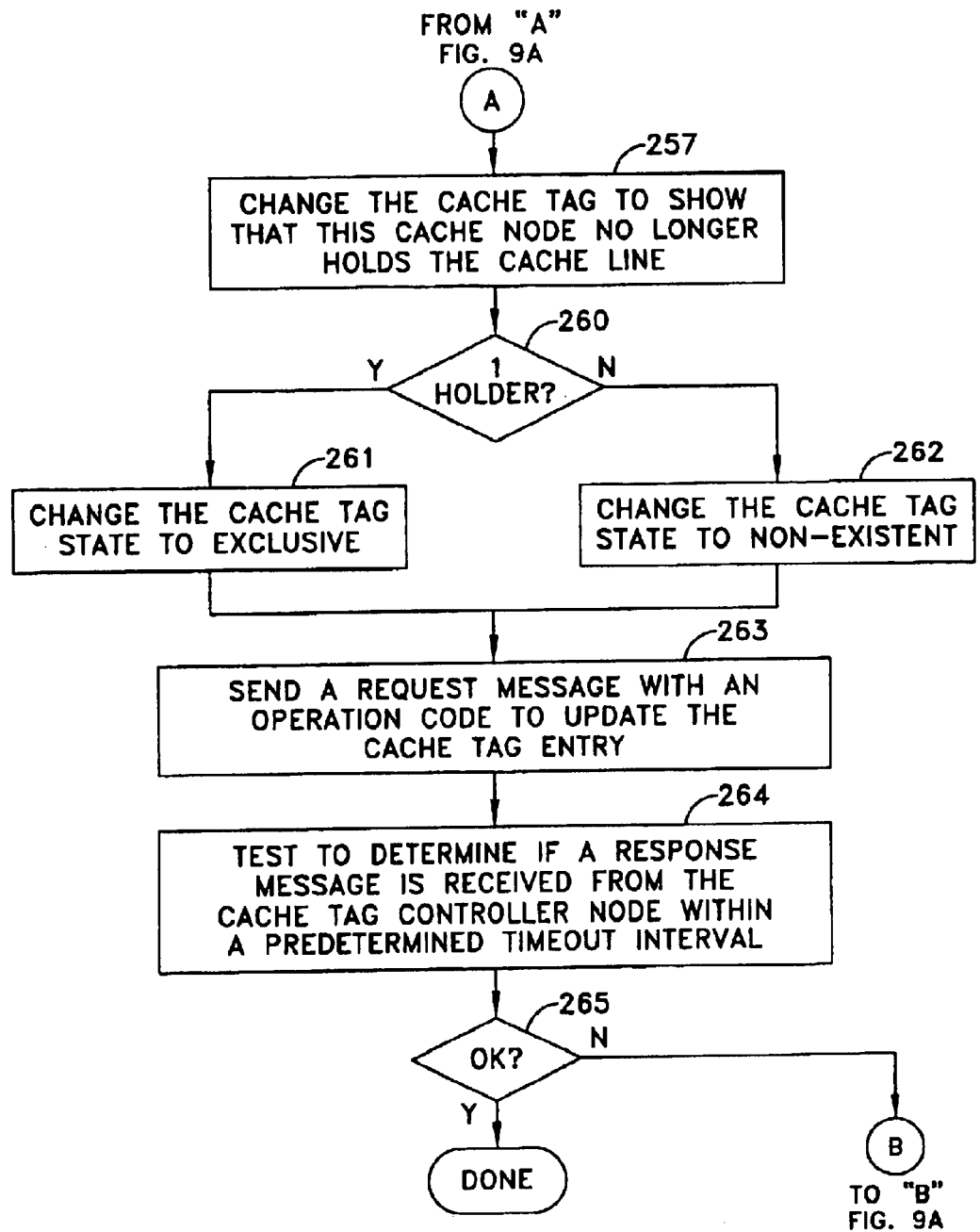

FIGS. 9A and 9B depict the operation of a cache node when either of the foregoing situations exists. In FIG. 9A step 250 represents identification of a cache line to be cast out or a decision to destage data from the cache line to its corresponding data storage location. When step 250 is processed, the cache tag and corresponding cache line will be in either the exclusive state or the modified-shared state. Step 251 causes the requesting cache node to issue a take-lock-always command to the cache tag controller node in a request message with a corresponding value in the OPCODE field 45, the cache identification in the REQUESTOR field 50 and the address in the ADDR field 46. The cache node controller responds using the procedure defined by steps 110 through 113 in FIG. 4B and does not change the cache tag state. During this operation, an address match will always occur so control transfers to step 112 that locks the tag and returns a valid positive response message.

If the response message is received within a timeout interval defined at step 252, step 253 transfers control to step 254. Again, in the context of a cast-out operation, the response should indicate that the requesting cache node holds the lock. If it does not, an error occurs and step 255 produces a response message with an error description. Normally, however, step 255 transfers control to step 256 in FIG. 9A.

Step 256 then controls subsequent operations depending upon whether the cache node is destaging data or has determined that a cache tag entry and corresponding cache line need to be cast out for another reason, as, for example, to remove the cache tag entry and cache line to make them available for another cache tag entry and cache line. That is, if a cast out operation, as opposed to a destaging operation, is being processed, step 256 transfers control to step 257 in FIG. 9B. Step 257 changes the cache tag entry to indicate that the node no longer holds the cache line. This is accomplished by shifting the 54-bit address to a null value.

Figure 10:
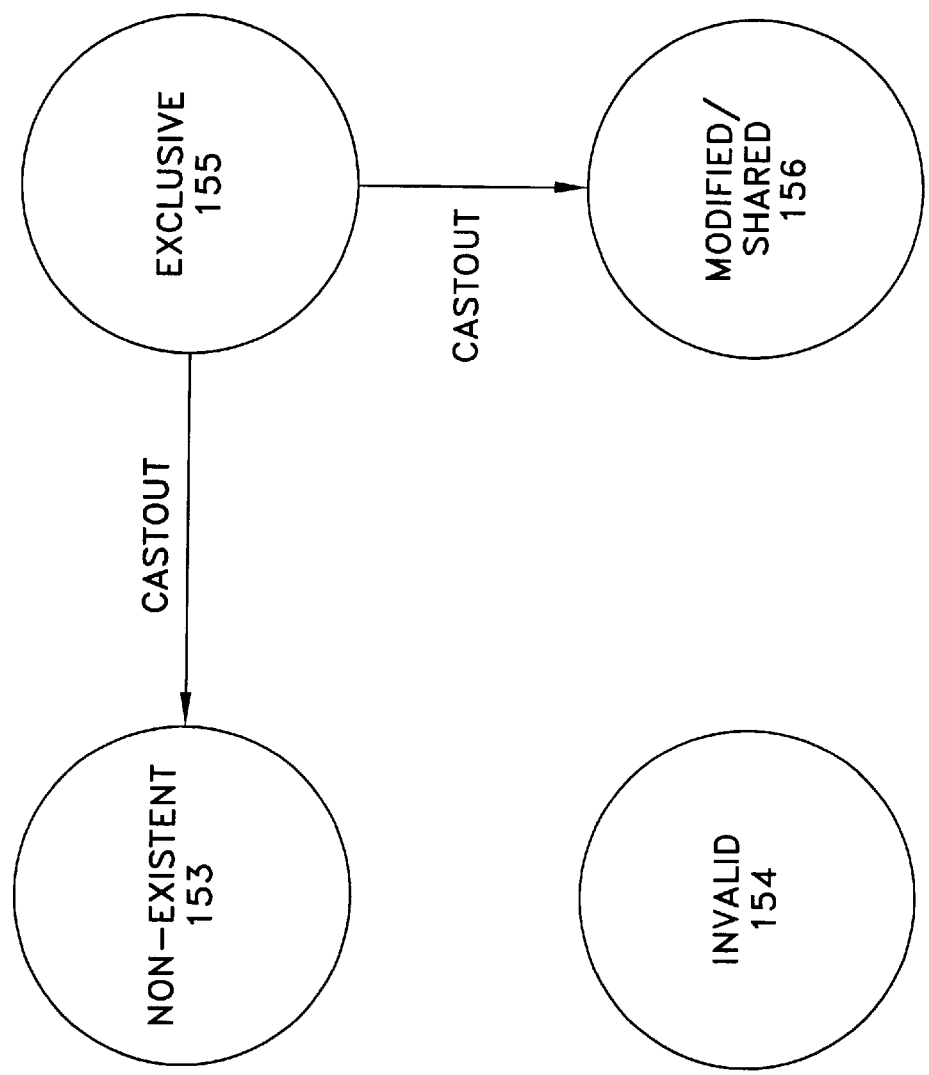
FIG. 10 is a state diagram that is useful in understanding the operations that occur within the data storage facility during a certain maintenance operations.

Next step 260 determines the number of I/O nodes that hold the cache line. As previously indicated, and as shown in FIG. 10, a cast-out operation can occur when either one cache node holds a cache line the exclusive state 155, or when or two cache nodes hold the same cache line, the modified shared state 156. As either one or two cache nodes will have held the cache line prior to this operation, after step 257 either no cache line will exist or one cache line will exist. If only one cache node contains the cache line, the tag is valid and cache line has an exclusive state. If no holder exists, step 262 shifts the cache line to a non-existent state.

After either step 261 or 262 completes its operations, steps 263 issues another request message to the cache tag controller node to update the cache tag according to the cache tag state, that is whether the state is exclusive or nonexistent. The cache tag controller does not change the cache tag state in its response to this request message.

Step 264 establishes a time-out interval, during which a response message should be received from the cache tag controller node. If the response message is received within that time interval, step 265 terminates the operation within the cache node. If a response is not received within the time interval, step 265 transfers control back to step 251 in FIG. 9A to try the operation again.

If the cache node procedure is FIGS. 9A and 9B is initiated in response to a destaging request, step 256 in FIG. 9A transfers control to step 266 that writes the cached data to the selected data storage location, such as to a specified location in magnetic disk storage devices. Next the cache node clears its corresponding bit in the MIRROR field 54 and determines whether all the mirror bits in the MIRROR field 54 have been cleared. If they have not been, additional destaging operations are necessary and the procedure of FIGS. 9A and 9B terminates. If data has been destaged to all the mirrored locations, step 267 transfers control to step 257 in FIG. 9B whereupon that procedure processes the cache tag as previously described.

Therefore, the procedure in FIGS. 9A and 9B provide one approach for making space available for responses to subsequent host read and write requests. That is, in the case of a response to a host write request, this procedure assures that one of the cache nodes will make an entry available once the data is in the mirrored data storage locations. In addition, each of the cache nodes constantly monitors its respective contents to assure that stale entries are eliminated in the unlikely event that the cache node uses all of its locations for cache lines. While FIGS. 9A and 9B provide one approach for keeping the cache lines and cache tags current, still other approaches might be used.

Alternative Data Storage Facility Embodiment

Figure 11:
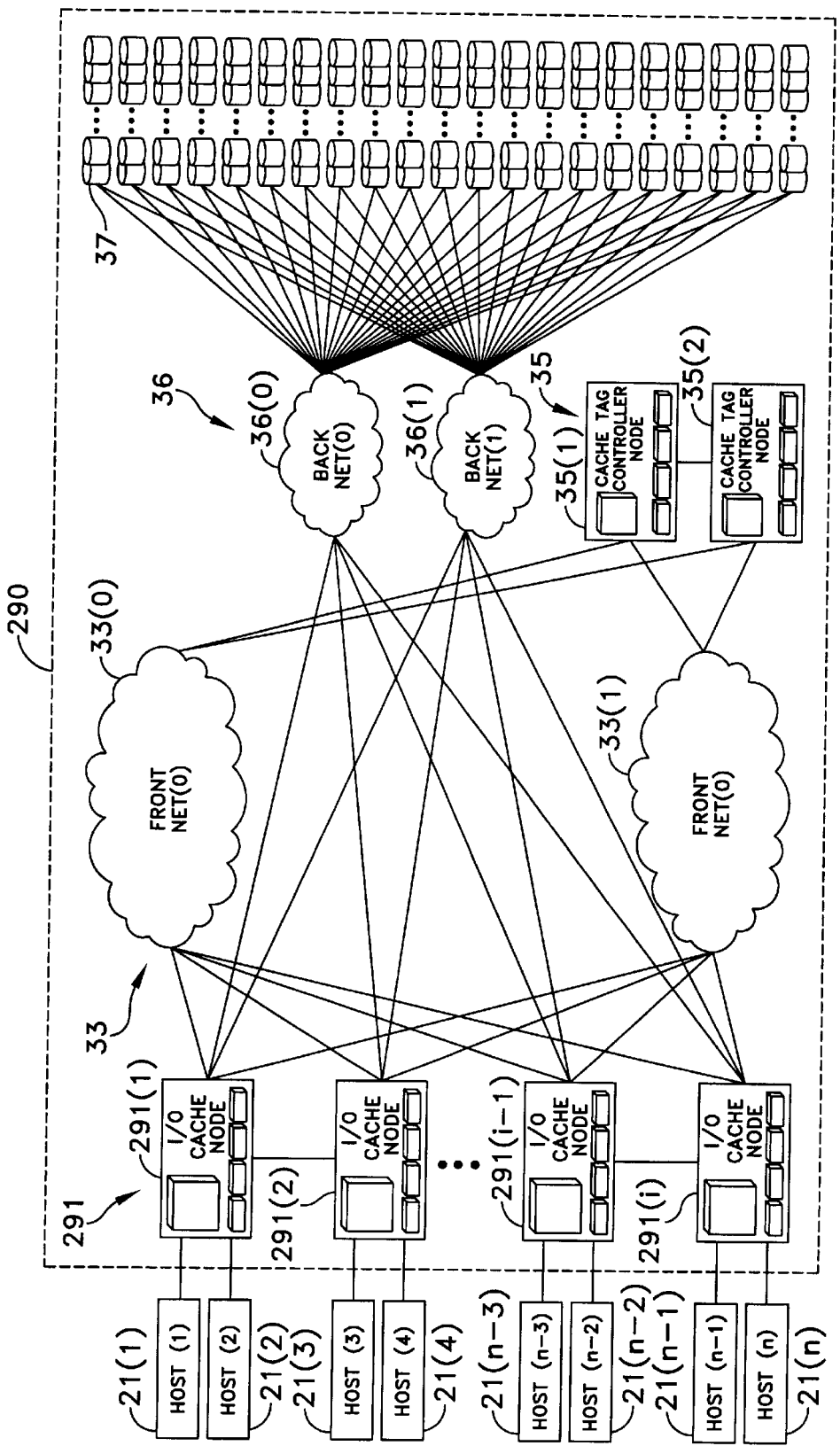
FIG. 11 is a diagram on another embodiment of a data storage facility constructed in accordance with this invention.

The basic building blocks described above can be rearranged with respect to alternate embodiments of a data storage facility. As one example, the data storage facility 20 in FIG. 1 discloses individual hardware nodes operating as I/O nodes 32 and as cache nodes 34. FIG. 11 depicts an alternative data storage facility 290. It uses many of the same building blocks and like reference numbers are used to designate like building blocks. For example, the data storage facility 290 includes a plurality of data storage locations 37 with two interconnections 36 in the form of a BACK NET(0) interconnection 36(0) and a BACK NET(1) interconnection 36(1), each having ports connected to all of the interfaces of the data storage locations. The data storage facility 290 also includes interconnections 33 with each a FRONT NET(0) interconnection 33(0) and a FRONT NET(1) interconnection 33(1) being attached to cache tag controller nodes 35 including first and second cache tag controllers 35(1) and 35(2).

The cache tag node controllers 35 have the same structure in operation as shown in FIG. 1. The data storage facility 290 in FIG. 11, however, combines the functions of a cache node and I/O node in a single hardware, or data-handling node 291. FIG. 11 specifically shows a plurality of I/O cache nodes 291(1), 291(2), 291(i1) and 291(i). Each of the I/O nodes 291 connects to one or two hosts 21.

Referring to FIGS. 11 and 2, each of the I/O cache nodes 291 is formed from a generic hardware node shown in FIG. 2. In this case, however, both the I/O node application and cache node application modules are active in the combined I/O-cache nodes. Both applications may be implemented either in a parallel mode, running on dedicated ones of the processors or in a multi-tasking parallel mode. A selection will depend upon the specific application for which the data storage facility 290 is being used. Otherwise, the data storage facility 290 has the same basic construction and forms the same data paths and control paths as the data storage facility in FIG. 1.

FIG. 11 also shows the data storage facility as a structure located at a local site. It will be apparent that the individual building blocks also could be located at one or more remote locations. Again, the specific configuration will depend upon the need for geographical dispersion and the availability of first and second interconnections such as interconnections 33 and 36, with sufficient bandwidth to handle the data.

As will now be apparent, a data storage facility 20, or any variations thereof, constitutes a data storage facility for operation with a plurality of data processors or hosts. Each of those processors can issue host transfer requests for performing a data transfer with the data storage facility. Each data storage facility includes a plurality of uniquely addressed data storage locations and controls for transferring data to and from those addressed locations. Typically magnetic disk storage devices will provide the data storage locations. However, optical or other storage devices adapted to be uniquely identified in a common address space could be substituted.

Each data storage facility includes a plurality of processor-controlled data handling nodes. In the embodiment of FIG. 1, these data handling nodes include the I/O nodes 32 and cache nodes 34. In the data storage facility 290 of FIG. 11, these include the I/O-cache nodes 291. Each of these data handling nodes responds to a host read or write request for identifying a specific data storage location. Each facility includes cache memory storage with cache locations for the data identified in the data transfer request such as fields corresponding to the DATA field 58 shown in FIG. 3A. Each embodiment includes processor-controlled cache tag controller nodes 35 that maintain cache tags. Each cache tag identifies a specific location for each addressed data storage location in a field corresponding to the ADDR field 46 in a request message shown in FIG. 3A. A first multi-path connection, for example the discrete interconnections 33(0) and 33(1) in FIGS. 1 and 11 interconnect the data handling nodes and the cache tag controller nodes. A second multi-path in the form of the discrete interconnections 36(0) and 36(1) interconnect the plurality of data storage locations 37 and the cache memory locations in the cache nodes 34.

As shown in FIG. 1, the data handling nodes are constituted by a first group of processor-controlled nodes that connect to at least one data processor. Each of these nodes, namely the I/O nodes 32 in FIG. 1, converts an address in a data request to an address for a storage location in the plurality of data storage devices comprising the physical disk drives 37. A plurality of a second group of processor-controlled nodes comprises the cache nodes 34 that operate as an independent cache memory for transferring data with the data storage locations in the plurality of data storage locations 37, such as provided by the magnetic disk drives. In this embodiment the cache tag controller nodes constitute a third group of processor controlled nodes that are adapted for parallel operation with each converting an address from the first group of nodes into a location in the second group of nodes.

Each of the specific embodiments in FIGS. 1 and 11 and other variations provide a method for transferring data between hosts such as host 21 in FIGS. 1 and 11 and the data storage locations in a common address space such as defined by a plurality of magnetic disk drives 37. The transferring method includes establishing a cache tag controller node having a plurality of cache tag controller storage locations that store status information or cache tags about corresponding data block storage locations in the cache memory, such as cache lines in each of the cache nodes 34. A response to a host request involves converting the address in the host request into an address for the specific data block storage location in the common address space defined by the data storage locations 37, such as the magnetic disk drives. The address for the common address space is also converted into an address of the cache tag controller storage location.

The contents of the cache tag controller storage location are tested to determine the presence of valid data in the corresponding cache line. This testing is shown in FIGS. 4A through 4D. The data storage facility then can selectively transfer data with the corresponding cache memory data block storage location for predetermined values of the status information such as defined in FIGS. 5A through 5D and 7A and 7C.

While FIGS. 1 and 11 depict two possible embodiments of the overall invention, it will also be apparent that the implementation of individual building blocks can also be modified. FIG. 2A, for example, discloses a four-processor system with a specific arrangement of components in a data storage area. Each of these hardware nodes 22 has a dedicated function; in FIG. 11 certain hardware nodes have dual functions, including the I/O node function and cache memory function. A hardware node can be implemented with conventional single or multiple processors using application software to define functions as shown in FIG. 2A. If the functions of such nodes are well defined, special-purpose processors, special-purpose chips, such a Field Programmable Gate Array (FPGA) chips, and other components that can perform the hardware node functions can be substituted. Still other configurations are possible. Thus, specific implementations of a hardware node, other than shown in FIG. 2A, could be devised while providing the same general functions as are required by this invention.

FIGS. 3A and 3B depict specific data and memory structures. Alternative structures could be provided. Using a combination of hash coding and a tree node shows the conversion of an address in a common address space to a location in a cache tag controller node. Other methods of making the conversion are possible.

FIGS. 4A through 4D depict specific sequences of operations for particular operation codes. It will be apparent that other operation codes could be included to perform similar functions or perhaps alternative functions. For example, the sequence of steps of 114 through 118 in FIG. 4B requires some testing steps in certain instances, but not in others. Although disclosed as a single sequence, an alternate sequence might be provided that reduces the resources required to perform certain operations, like those required by steps 115 and 116.

Each of FIGS. 5A through 5D, 7A through 7C, 9A and 9B depicts specific implementations of application modules used by I/O nodes during read and write operations and by cache nodes for cast out operations. Other sequences could be developed including some or all or more steps; sequences might also be altered. Another data storage facility utilizing this invention could be implemented by any of these variations and other variations.

In addition, the numbers of cache nodes such as the cache nodes 33 and 34 in FIG. 1, the number of I/O nodes 32 and the number of cache tag controller nodes 35 will also be dependent on the size of the common address space in a specific implementation. Further influences on a specific configuration will include the nature of the application. For example, on-line transaction processing will generally involve writing operations to a finite number of data storage locations. The organization of the data in the data storage locations may require a ratio of cache node locations to data storage locations that is large. On the other hand if the data storage locations contain video streaming, the number of cache node locations will be more dependent on the number of users and a need to optimize throughput from the data storage locations through the cache node locations to the host.

Thus, it will be apparent that a data storage facility can be constructed using the building blocks of this invention that meets the general objectives of this invention. That is, each of the specifically disclosed embodiments in FIGS. 1 and 11 discloses a distributed cache scalable data storage facility that provides high performance. It is a system that is scalable to large sized data storage capacities. A system embodying this invention provides a fully redundant facility for handling data. Further this system is adapted to be scalable both in respect to the number hosts it serves and to the capacity of the data storage facility.

In addition, the use of a common hardware node construction architecture customized by a particular application module provides hardware redundancy for reliability, particularly as any given node can be substituted for any other node merely by changing a controlling application module. Therefore, it will be apparent that a data storage facility such as shown in FIG. 1 or 11 or any variation thereof meets the several objectives of this invention.

This invention has been has been disclosed in terms of certain embodiments. It will be apparent that many of the foregoing and other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A data storage facility for operation with a plurality of data processors each of which can issue a host request to initiate a data transfer with the data storage facility, said data storage facility comprising:

A) a plurality of uniquely addressed data storage locations and controls for transferring data to and from the addressed locations, B) a plurality of processor-controlled data handling nodes responsive to a host request for identifying a specific data storage location, said processor-controlled data handling nodes including cache memory storage at cache memory locations for the data identified in the host request, C) processor-controlled cache tag controller nodes for maintaining cache tags that identify a specific cache location for each addressed data storage location in response to the processing of a data transfer request in said data handling nodes, D) a first multi-path connection interconnecting said data handling nodes and said cache tag controller nodes, and E) a second multi-path connection interconnecting said plurality of data storage locations and said cache memory locations.

2. A data storage facility as recited in claim 1 wherein the data storage location addresses occupy a common address space and wherein each said data handling node includes storage for address conversion information thereby to convert a host request address into an address for a specific data storage location in the common address space and said cache tag controller nodes contain information for converting the data storage location address into an address for a cache tag entry in the cache tag controller node and a corresponding cache memory location.

3. A data storage facility as recited in claim 2 wherein each data handling node identifies a cache memory location using multiple-field, cache-coherent protocol messages to effect transfers between the cache memory locations and the data storage locations in response to a host request, each said message including operation code, address, node identification, data length and data fields, the address field containing the address the specific data storage location in the common address space.

4. A data storage facility as recited in claim 3 adapted for operating with redundant paths for certain data transfers wherein each node identification field identifies a first data handling node with cache memory and a second, redundantly operating, data handling node with cache memory storage.

5. A data storage facility as recited in claim 3 wherein cache tag controller entry can be locked in response to a message from a data handling node to respond to messages only from the requesting data handling node and wherein said cache tag controller node responds to multiple-field, cache-coherent protocol messages that include operation code, address, node identification and lock owner fields, said lock owner field identifying a data handling node that holds any lock on the cache tag entry.

6. A data storage facility as recited in claim 2 wherein each of said cache memory locations and cache tag entries is characterized by one of four operating states including a non-existent state when the requested cache tag entry and cache memory location do not exist in any cache tag controller node or cache memory location, an invalid state when a cache tag entry exists but the corresponding cache memory location does not contain valid data, an exclusive state when a single cache memory location contains valid data and a modified-shared state when two cache memory locations contain the same valid data.

7. A data storage facility as recited in claim 6 wherein said cache tag controller node includes means responsive to certain request messages for generating one of a plurality of responses to each host request and wherein said cache tag controller node includes means responsive to certain request messages for altering the operating state for the corresponding cache memory and cache tag entry locations.

8. A data storage facility as recited in claim 7 wherein said cache tag controller node has a state control and a preexisting operating state for a cache tag entry and wherein said host request is a host read request for initiating a transfer of data from said data storage facility and wherein valid data is stored in the corresponding cache memory location, said state control leaving the preexisting operating state unchanged.

9. A data storage facility as recited in claim 7 wherein said cache tag controller node has a state control and wherein said host request is a host read request for initiating a transfer of data from said data storage facility and wherein said cache tag controller node includes means for identifying a cache tag entry and corresponding cache memory location for the host read request data by indicating in the cache tag entry and corresponding cache memory storage location that the cache memory location contains invalid data and transferring data from the said data storage locations to the cache memory location, said state control transferring the state from the non-existent state to the invalid state and then changing the state to the exclusive state after which the requested data transfers to the host from said cache memory location.

10. A data storage facility as recited in claim 7 wherein said cache tag controller node has a state control and a preexisting operating state for the cache node entry and wherein said host request is a host write request for initiating a transfer of data to said data storage facility and wherein valid data can be stored in the two corresponding cache memory locations, said state control establishing the modified-shared state.

11. A data storage facility as recited in claim 7 wherein said cache tag controller node has a state control and wherein said host request is a host write request for initiating a transfer of data to said data storage facility and wherein the state is the non-existent state, said cache tag controller identifying a cache tag entry and corresponding cache memory location for the data and said state control initially changing the state to an invalid state and then changing the state to a modified-shared state if the write request is successful, said data handling node generating a host return of success if the data successfully transfers to the addressed data storage location.

12. A data storage facility as recited in claim 1 wherein certain of said data handling devices constitute I/O nodes with a first interface for connection to a data processor and a second interface for connection to first multi-path connection.

13. A data storage facility as recited in claim 1 wherein certain of said data handling nodes constitute cache nodes with a first interface for connection to said first multi-path connection and a second interface for connection to said second multi-path connection.

14. A data storage facility as recited in claim 13 wherein the others of said data handling devices constitute I/O nodes, each I/O node having a first interface for connection to a data processor and a second interface for connection to first multi-path connection whereby said first and second multi-path connections provide first and second independent paths between said I/O nodes and said cache nodes and between said I/O nodes and said cache tag controller nodes and between said cache nodes and said data storage devices.

15. A data storage facility as recited in claim 14 wherein at least one of said first and second multi-path connections comprises a local area network.

16. A data storage facility as recited in claim 14 wherein at least one of said first and second multi-path connections comprises a wide-area network whereby individual ones of said I/O nodes, cache nodes and cache tag controller nodes can be located at a distance from each other.

17. A data storage facility as recited in claim 1 wherein each of said data handling nodes and said cache tag controller nodes comprises at least one processor, random access memory, first and second interfaces and an interconnecting bus.

18. A data storage facility as recited in claim 1 wherein each of said data handling nodes and said cache nodes comprises a processor module with first and second interfaces.

19. A data storage facility as recited in claim 18 wherein said processor module includes a plurality of processor modules.

20. A data storage facility as recited in claim 19 wherein at least one of the first and second interfaces connects to one of the first and second multi-path connections that comprises a local area network.

21. A data storage as recited in claim 19 wherein at least one of the first and second interfaces connects to one of the first and second multi-path connections that comprises a wide area network.

22. A data storage facility for operation with at least one data processor that issues host requests, said data storage facility comprising:
  A) a plurality of data storage devices with a plurality of persistent data storage locations,
  B) at least one of a first group of processor-controlled I/O nodes adapted for connection to at least one data processor, each said I/O node including means for converting an address in a host request to an address for a specific data storage location in the plurality of data storage devices,
  C) a plurality of a second group of processor-controlled cache nodes, each said cache node including a memory adapted to operate as an independent cache memory for transferring data with storage locations in the plurality of data storage devices,
  D) at least first and second processor-controlled cache tag controller nodes, said cache tag controller nodes being connected for parallel operation and each said cache tag controller node converting each address from said I/O nodes into a location that defines a cache tag entry location in the cache tag controller node and a corresponding location in the cache nodes,
  E) a first multi-path connection interconnecting said I/O, cache and cache tag controller nodes, and
  F) a second multi-path connection interconnecting said plurality of said data storage devices and said cache nodes whereby said data storage facility provides parallel paths for each data transfer in response to a data request.

23. A data storage facility as recited in claim 22 wherein the data storage location addresses occupy a common address space and wherein each said I/O node includes storage for address conversion information thereby to convert a host request address into an address for a specific data storage location in the common address space and each of the cache tag controller nodes contains information for converting the data storage location address into an address for a cache tag entry in the cache tag controller node and a corresponding cache memory location in a cache node.

24. A data storage facility as recited in claim 23 wherein each cache tag controller node identifies a cache memory location and cache tag entry location using multiple-field, cache-coherent protocol messages to effect transfers with the cache memory locations in the identified cache node and the requesting I/O node in response to a host request, each said message including operation code, address, node identification, data length and data fields, the address field containing the address the specific data storage location in the common address space.

25. A data storage facility as recited in claim 24 adapted for operating with redundant paths for certain data transfers wherein each node identification field identifies first and second cache nodes for handling the data involved with the transfer.

26. A data storage facility as recited in claim 23 wherein cache tag controller entry can be locked in response to a message from one of the I/O and cache nodes to respond to respond to messages only from that node and wherein said cache tag controller node responds to multiple-field, cache-coherent protocol messages that include operation code, address, node identification and lock owner fields, said lock owner field identifying the node that holds any lock on the cache tag entry location.

27. A data storage facility as recited in claim 23 wherein each of said cache memory locations and cache tag entries is characterized by one of four operating states including a non-existent state when the requested cache tag entry and cache memory location do not exist in any cache tag controller node or cache memory location, an invalid state when a cache tag entry exists but the corresponding cache memory location does not contain valid data, an exclusive state when a single cache memory location contains valid data and a modified-shared state when two cache memory locations contain the same valid data.

28. A data storage facility as recited in claim 27 wherein said cache tag controller node includes means responsive to certain request messages for generating one of a plurality of responses to each host request and wherein said cache tag controller node includes means responsive to certain request messages for altering the operating state for the corresponding cache memory and cache tag entry locations.

29. A data storage facility as recited in claim 28 wherein said cache tag controller node has a state control and a preexisting operating state for a cache tag entry and wherein a host request is a host read request for initiating a transfer of data from said data storage facility and wherein valid data is stored in the corresponding cache memory location in a cache node, said state control leaving the preexisting operating state unchanged.

30. A data storage facility as recited in claim 28 wherein said cache tag controller node has a state control and wherein said host request is a host read request for initiating a transfer of data from said data storage facility and wherein said cache tag controller node includes means for identifying a cache tag entry and corresponding cache memory location for the host read request data by indicating in the cache tag entry and corresponding cache memory storage location that the cache memory location contains invalid data and transferring data from the said data storage locations to the cache memory location, said state control transferring the state from the non-existent state to the invalid state and then changing the state to the exclusive state after which said I/O node transfers the requested data to the host from said cache memory location in said cache node.

31. A data storage facility as recited in claim 28 wherein said cache tag controller node has a state control and a preexisting operating state for the cache memory location and corresponding cache tag entry and wherein said host request is a host write request for initiating a transfer of data to said data storage facility and wherein valid data can be stored in cache memory locations in two cache nodes, said state control establishing the modified-shared state.

32. A data storage facility as recited in claim 28 wherein said cache tag controller node has a state control and wherein said host request is a host write request for initiating a transfer of data to said data storage facility and wherein the state is the non-existent state, said cache tag controller identifying a cache tag entry and corresponding cache memory location in a cache node for the data and said state control initially changing the state to an invalid state and then changing the state to a modified-shared state if the write request is successful, said I/O node generating a host return of success if the data successfully transfers to the addressed locations in the cache nodes.

33. A data storage facility in claim 23 wherein in response to the receipt of a host write request said I/O node identifies multiple cache nodes for receiving the data to be transferred to a specific data storage location.

34. A data storage location as recited in claim 23 wherein said I/O node contains information identifying mirroring storage locations in said data storage devices and said I/O node includes means for generating an address for each mirroring storage location.

35. A data storage facility as recited in claim 23 wherein each cache node includes means for sending request messages to said cache tag controller nodes for terminating the relationship between a specific cache tag entry and corresponding cache node memory location and a data storage location address whereby each cache tag controller and cache node location can identify different data storage locations.

36. A method for transferring data in response to a host request with a data storage facility with a first plurality of persistent data storage locations having addresses in a first common address space, said method comprising:
   A) establishing a second plurality of cache memory locations in another address space, each of which can store data,
   B) establishing cache tag locations for each of the second plurality of cache memory locations, each cache tag location entry adapted to store a cache tag entry with status information about a corresponding cache memory location,
   C) responding to each host request by:
      i) converting an address in the data transfer request into an address in the first common address space,
      ii) converting the address for the first common address space into an address for a cache tag entry location,
      iii) testing the cache tag in the cache tag location to determine the presence of a cache memory location that corresponds to the location in the host request, and
      iv) initiating a transfer of data with the corresponding cache memory location for predetermined values of the corresponding status information.

37. A method as recited in claim 36 wherein said method additionally comprises generating a sequence of request messages for obtaining the status of a cache memory location and generating response messages with the requested status.

38. A method as recited in claim 37 additionally comprising accepting a response message received within a predetermined timeout interval and instituting a retry operation by restarting the sequence of request messages when the response message is received after the predetermined timeout interval.

39. A method as recited in claim 37 additionally comprising counting each retry operation for a given host request and terminating the response to the host request if the count of retry operations exceeds a predetermined maximum and monitoring the response time that expires after an initial sequence begins to terminate the response to the host request if the response time exceeds a predetermined timeout interval.

40. A method as recited in claim 37 wherein certain of the request messages identify a cache tag entry location and others identify a cache memory location.

41. A method as recited in claim 37 wherein a host request is a host read request for transferring data from a specific data storage location and wherein a first request message requests the status of the cache tag in the cache tag location corresponding to the address in the first common address space and the response message indicates whether the located cache tag corresponds to the requested address and is unlocked.

42. A method as recited in claim 41 wherein the response message indicates that the located cache tag entry corresponds to the requested address and is unlocked, said method additionally sending a second request message that initiates a transfer of the data in the specified cache memory location and generating a response message with the data for the response to the host read request.

43. A method as recited in claim 41 wherein the response message fails to indicate that the located cache tag corresponds to the requested address and is unlocked, said method additionally generating a second request message requesting the data to be transferred to the specified cache memory location from the corresponding data storage location and generating a response message with the data from the specified cache memory location.

44. A method as recited in claim 43 additionally comprising sending a third request message for unlocking the cache tag and generating a response message indicating the success of that operation.

45. A method as recited in claim 37 wherein a host request is a host write request with data for transfer to a specific data storage location, said method comprising generating a first request message identifying two cache memory locations for receiving the data in the host write request and requesting the status of each cache tag, and generating a response message indicating whether each located cache tag corresponds to the requested address and is locked for use in the specified transfer.

46. A method as recited in claim 45 wherein the response message indicates that the located cache tags correspond to the requested address and are locked for use in the specified transfer, said method comprising sending a second request message to each of the cache memory locations identified by the cache tags with the data from the host request.

47. A method as recited in claim 46 additionally comprising sending a response message to the second request message indicating success and sending a third request message to unlock the cache tag.

48. A method as recited in claim 47 wherein the cache tag locations and locations in the cache memory are characterized by operating states including exclusive and modified-shared operating states indicating only one location in one cache memory location or two cache memory locations, respectively, contain data for one data storage location, said method additionally comprising the step of responding to the third request message by updating the operating state for the selected cache memory location to a modified-shared state and by sending a response message.

49. A method as recited in claim 46 wherein the a plurality of data storage locations are to receive the data in the host write request, said method comprising sending a request message to lock the addressed cache tags and upon receipt of a response message indicating that success of that operation, determining if the data has been written to all the data storage locations by terminating the correspondence between the cache tag and the data storage location in the first common address space.

50. A method as recited in claim 37 additionally comprising monitoring the utilization of the cache memory, selecting a cache memory location that can be made available for other data storage locations and, in response to the selection, generating a first request message to lock the corresponding cache tag and upon receipt of a response message indicating that success of that operation, terminating the correspondence between the cache tag and the data storage location in the first common address space.

51. A data storage facility with a first plurality of persistent data storage locations having addresses in a first common address space for transferring data in response to host requests, said facility comprising:
A) a second plurality of cache memory locations in another address space, each of which can store data,
B) a cache tag location for each of the second plurality of cache memory locations, each cache tag location adapted to store a cache tag with status information about a corresponding cache memory location,
C) a control including:
i) first conversion means for converting an address in the data transfer request into an address in the first common address space,
ii) second conversion means for converting the address for the first common address space into an address for a cache tag entry location,
iii) testing means for testing the cache tag in the cache tag location to determine the presence of a cache memory location that corresponds to the location in the host request, and
iv) means for initiating a transfer of data with the corresponding cache memory location for predetermined values of the corresponding status information.

52. A data storage facility as recited in claim 51 additionally comprising means for generating a sequence of request messages for obtaining the status of a cache memory location and generating response messages with the requested status.

53. A data storage facility as recited in claim 52 additionally comprising means for defining a predetermined time internal during which a response message will be accepted and means for restarting the sequence of request messages when the response message is received after the predetermined timeout interval.

54. A data storage facility as recited in claim 52 additionally comprising means for counting each retry operation for a given host request, means for terminating the response to the host request if the count of retry operations exceeds a predetermined maximum and means for monitoring the response time that expires after an initial sequence begins and means for terminating the response to the host request if the response time exceeds a predetermined timeout interval.

55. A data storage facility as recited in claim 52 comprising means for generating request messages that identify a cache tag entry location and means for generating request messages that identify a cache memory location.

56. A data storage facility as recited in claim 52 wherein a host request is a host read request for transferring data from a specific data storage location, said data storage facility additionally comprising means for generating a first request message to obtain the status of a cache tag in the cache tag location corresponding to the address in the first common address space and means for generating a response message to indicate whether the located cache tag entry corresponds to the requested address and is unlocked.

57. A data storage facility as recited in claim 56 wherein the response message indicates that the located cache tag corresponds to the requested address and is unlocked, said data storage facility additionally comprising means for sending a second request message that initiates a transfer of the data in the specified cache memory location and means for generating a response message to the second request message with the data for the response to the host read request.

58. A data storage facility as recited in claim 56 wherein the response message fails to indicate that the located cache tag corresponds to the requested address and is unlocked, said data storage facility additionally comprising means for generating a second request message requesting the data to be transferred to the specified cache memory location from the corresponding data storage location and means for generating a response message with the data from the specified cache memory location.

59. A data storage facility as recited in claim 58 additionally comprising means for sending a third request message for unlocking the cache tag and means for generating a response message indicating the success of that operation.

60. A data storage facility as recited in claim 52 wherein a host request is a host write request with data for transfer to a specific data storage location, said data storage facility additionally comprising means for generating a first request message identifying two cache memory locations for receiving the data in the host write request and means for requesting the status of each cache tag and means for generating a response message indicating whether each of the located cache tags corresponds to the requested address and is locked for use in the specified transfer.

61. A data storage facility as recited in claim 60 wherein the response message indicates that the located cache tags correspond to the requested address and are locked for use in the specified transfer, said data storage facility additionally comprising means for sending a second request message to each of the cache memory locations identified by the cache tags with the data from the host request.

62. A data storage facility as recited in claim 61 additionally comprising means for sending a response message to the second request message indicating success and means for sending a third request message to unlock the cache tag.

63. A data storage facility as recited in claim 62 wherein the cache tag locations and cache memory locations are characterized by operating states including exclusive and modified-shared operating states indicating only one location in one cache memory location or two cache memory locations, respectively, contain data for one data storage location, said data storage facility additionally comprising means responsive to the third request message for updating the operating state to a modified-shared state and means for sending a response message.

64. A data storage facility as recited in claim 61 wherein the a plurality of data storage locations are to receive the data in the host write request, said data storage facility comprising means for sending a request message to lock the addressed cache tag, means for generating a response message indicating that success of that operation and means responsive to a response message indicating that the data has been written to all the data storage locations for terminating the correspondence between the cache tag and the data storage location in the first common address space.

65. A data storage facility as recited in claim 52 additionally comprising means for monitoring the utilization of the cache memory, means for selecting a cache memory location that can be made available for other data storage locations, means responsive to the selection for generating a first request message to lock the corresponding cache tag and means responsive to a response message indicating that success of that operation for terminating the correspondence between the cache tag and the data storage location in the first common address space.

66. A data storage facility with a first plurality of persistent data storage locations in a plurality of magnetic disk drives having addresses in a first common address space and having control logic for transferring data in response to host requests, said facility comprising:
A) a plurality of cache nodes comprising a second plurality of cache memory locations in another address space, each of said cache memory locations being adapted to store data, B) a plurality of cache tag controller nodes comprising redundant cache tag locations for each of the second plurality of cache memory locations, each cache tag location adapted to store a cache tag with status information about a corresponding cache memory location, and C) a control including:
   i) a first address converter that converts an address in the data transfer request into an address in the first common address space,
   ii) a second address converter that converts the address for the first common address space into an address for a cache tag location,
   iii) a tester that determines the presence of a cache tag location that corresponds to the location in the host request, and
   iv) a transfer control that transfers data with the corresponding cache memory location for predetermined values of the corresponding status information.

67. A data storage facility as recited in claim 66 additionally comprising a message sequencer that generates a sequence of request messages for obtaining the status of a cache tag location and response messages with the requested status.

68. A data storage facility as recited in claim 67 additionally comprising means for a timer that defines a predetermined time internal during which a response message will be accepted and a control that restarts the sequencer when a response message is received after the predetermined timeout interval.

69. A data storage facility as recited in claim 67 additionally comprising means a retry counter that is modified curing each retry operation for a given host request, a control that terminates the response to the host request if the retry counter exceeds a predetermined maximum and a timer-based monitor that terminates the response to the host request if said monitor determines that the response time exceeds a predetermined timeout interval.

70. A data storage facility as recited in claim 67 comprising a plurality of I/O nodes, a request message generator in each I/O node for transmitting messages to the cache nodes and cache controller node and a request message generator in each cache node for transmitting messages to the cache tag controller nodes.

71. A data storage facility as recited in claim 67 wherein a host request is a host read request for transferring data from a specific data storage location, said sequencer comprising a first request message generator that transmits a first request message to the said cache tag controller to obtain the status of a cache tag corresponding to the address in the first common address space and a first a response message generator that transmits a response message when the cache tag corresponds to the requested address and is unlocked.

72. A data storage facility as recited in claim 71 wherein said response message indicates that the located cache tag corresponds to the requested address and is unlocked, said I/O node including a second request message that transmits a request message to an identified cache node whereby the cache node initiates a transfer of the data in the specified cache memory location and a second response message generator in the cache node for transmitting a response message to the requesting I/O node with the data for the response to the host read request.

73. A data storage facility as recited in claim 71 wherein the response message fails to indicate that the located cache tag corresponds to the requested address and is unlocked, said data storage facility additionally comprising a second request message generator in each cache node that requests the data to be transferred to the specified cache memory location from the corresponding data storage location and a second response message generator in each cache node for transmitting a response message with the data from the specified cache memory location.

74. A data storage facility as recited in claim 73 additionally comprising a third request message generator in said I/O nodes that transmits a request message to the cache tag controller for unlocking the cache tag and a response message generator in each cache tag controller node for generating a message indicating the success of that operation.

75. A data storage facility as recited in claim 67 wherein a host request is a host write request with data for transfer to a specific data storage location, said data storage facility additionally comprising a first request message generator in each I/O node for identifying two cache memory locations for receiving the data in the host write request and a response message generator in each said cache tag controller for transmitting a response message to a cache node indicating whether each of the located cache tags corresponds to the requested address and is locked for use in the specified transfer.

76. A data storage facility as recited in claim 75 wherein the response message indicates that the located cache tags correspond to the requested address and are locked for use in the specified transfer, said data storage facility additionally comprising a second request message generator in each said I/O node for transmitting a request message to cache nodes by the cache tags with the data from the host request.

77. A data storage facility as recited in claim 76 additionally comprising a second response generator in said cache tag controller transmitting a response message to the I/O node indicating success and a third request message generator in the I/O node for transmitting a third request message to unlock the cache tag.

78. A data storage facility as recited in claim 77 wherein the cache tag locations and cache memory locations are characterized by operating states including exclusive and modified-shared operating states indicating only one location in one cache memory location or two cache memory locations, respectively, contain data for one data storage location, said data storage facility additionally comprising a third request message generator in each cache node for transmitting a third request message that updates the operating state to a modified-shared state and a response message generator in each cache tag controller for transmitting a response message.

79. A data storage facility as recited in claim 76 wherein the a plurality of data storage locations are to receive the data in the host write request, said data storage facility comprising a request message generator in each I/O node for generating a request message to lock the addressed cache tag, a response generator in each cache tag controller node for generating a response message indicating that success of that operation and a second request message generator in each cache node that responds to a response message indicating that the data has been written to all the data storage locations for terminating the correspondence between the cache tag and the data storage location in the first common address space.

80. A data storage facility as recited in claim 67 additionally comprising means for monitoring the utilization of the cache memory, means for selecting a cache memory location that can be made available for other data storage locations, means responsive to the selection for generating a first request message to lock the corresponding cache tag and a response message generator for transmitting a response message indicating the success of that operation thereby to terminate the correspondence between the cache tag and the data storage location in the first common address space.

* * * * *